US012457470B2

United States Patent
Zhang et al.

(10) Patent No.: US 12,457,470 B2
(45) Date of Patent: Oct. 28, 2025

(54) RELATIVE POSITIONING METHOD, APPARATUS, AND SYSTEM

(71) Applicant: HUAWEI TECHNOLOGIES CO., LTD., Guangdong (CN)

(72) Inventors: Hongping Zhang, Shenzhen (CN); Huiming Sun, Shanghai (CN); Qinghai Zeng, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 705 days.

(21) Appl. No.: 17/826,669

(22) Filed: May 27, 2022

(65) Prior Publication Data

US 2022/0286810 A1  Sep. 8, 2022

Related U.S. Application Data

(63) Continuation of application No. PCT/CN2019/122075, filed on Nov. 29, 2019.

(51) Int. Cl.
*H04W 4/02* (2018.01)
(52) U.S. Cl.
CPC .................. *H04W 4/023* (2013.01)
(58) Field of Classification Search
CPC ............................ H04W 4/023; H04W 64/006
See application file for complete search history.

(56) References Cited

U.S. PATENT DOCUMENTS

| 7,898,472 B2* | 3/2011 | Zeng ..................... G01S 5/0072 342/357.34 |
| 2010/0245171 A1 | 9/2010 | Zeng |
| 2016/0183044 A1* | 6/2016 | Wei ....................... H04W 76/14 455/456.1 |
| 2016/0295589 A1* | 10/2016 | Nikopour .............. H04W 4/023 |
| 2016/0332624 A1* | 11/2016 | Tezuka ................... G08G 1/123 |

FOREIGN PATENT DOCUMENTS

| CN | 104748736 A | 7/2015 |
| CN | 106959108 A | 7/2017 |
| CN | 109398352 A | 3/2019 |

(Continued)

OTHER PUBLICATIONS

National Taiwan University, "Localization-Assisted Mobility Support for NR Vehicular Communication", 3GPP TSG RAN WG1 #86 R1-167772, Aug. 26, 2016, total 4 pages.

(Continued)

*Primary Examiner* — Kabir A Timory
(74) *Attorney, Agent, or Firm* — WOMBLE BOND DICKINSON (US) LLP

(57) ABSTRACT

A first terminal obtains a plurality of first relative positions. Each of the plurality of first relative positions is determined based on a second relative position and a third relative position. The first relative position is an initial relative position between the first terminal and a second terminal, the second relative position is a relative position between the first terminal and a reference point, and the third relative position is a relative position between the second terminal and the reference point. The first terminal processes the plurality of first relative positions, to obtain a relative position between the first terminal and the second terminal.

18 Claims, 10 Drawing Sheets

(56) References Cited

FOREIGN PATENT DOCUMENTS

| CN | 109655786 A | 4/2019 |
|----|-------------|--------|
| EP | 1705496 A1 | 9/2006 |
| WO | 2019179606 A1 | 9/2019 |

OTHER PUBLICATIONS

3GPP TS 22.261 V17.0.0 (Sep. 2019), 3rd Generation Partnership Project; Technical Specification Group Services and System Aspects; Service requirements for the 5G system; Stage 1(Release 17), 82 pages.

3GPP TS 22.261, V17.0.1 "3rd Generation Partnership Project; Technical Specification Group Services and System Aspects; Service requirements for the 5G system; Stage 1 (Release 17)", Oct. 3, 2019, pp. 1-83, XP051785126.

3GPP TR 22.832, V17.0."3rd Generation Partnership Project; Technical Specification Group Services and System Aspects; Study on enhancements for cyber physical control applications in vertical domains; Stage 1 (Release 17)", Oct. 3, 2019, pp. 1-82, XP051785128.

\* cited by examiner

RELATIVE POSITIONING METHOD, APPARATUS, AND SYSTEM

CROSS-REFERENCE TO RELATED APPLICATIONS

This application is a continuation of International Application No. PCT/CN2019/122075, filed on Nov. 29, 2019, the application of which is hereby incorporated by reference in its entirety.

TECHNICAL FIELD

Embodiments of this application relate to the field of communication technologies, and in particular, to a relative positioning method, an apparatus, and a system.

BACKGROUND

In a vehicle-to-everything (V2X) communication system, a terminal may perform communication with another terminal over a direct link, for example, vehicle to vehicle (V2V) communication, vehicle to pedestrian (V2P) communication, vehicle to infrastructure (V2I) communication, or vehicle to network (V2N) communication.

In the V2X communication system, in some application scenarios, to improve user experience, when a terminal communicates with another terminal, the terminal needs to obtain a relative position between the terminal and a peer end. For example, to meet a terminal 2 within specified time, a terminal 1 needs to adjust a current vehicle speed based on a relative position between the terminal 1 and the terminal 2 with reference to a time limit, to ensure that the terminal 1 meets the terminal 2 within the specified time. Therefore, in the V2X communication system, to improve user experience, obtaining a relative position between terminals becomes increasingly important.

Currently, the terminal may obtain the relative position between the terminal and the peer end by using the following process: The terminal obtains an absolute position of the terminal and an absolute position of the peer end, and performs calculation on the absolute position of the terminal and the absolute position of the peer end, to obtain the relative position between the terminal and the peer end. For example, when the terminal 1 obtains a relative position between the terminal 1 and the terminal 2, the terminal 1 obtains an absolute position 1 of the terminal 1 and an absolute position 2 of the terminal 2, and performs calculation on the absolute position 1 and the absolute position 2 to obtain the relative position between the terminal 1 and the terminal 2. In this process, the two terminals need to respectively perform GPS positioning to determine the absolute positions. However, in some scenarios, a GPS signal received by a terminal may be weak or even the terminal cannot receive the GPS signal, and the reason may be, for example, that the GPS signal of the terminal is shielded. The terminal cannot obtain a high precision absolute position based on the weak GPS signal or even cannot obtain an absolute position. Therefore, a high precision relative position between terminals cannot be obtained, or even a relative position between the terminals cannot be obtained.

SUMMARY

In view of this, an objective of the present application is to provide a relative positioning method, an apparatus, and a system, to resolve a problem that when precision of an absolute position of a terminal or a peer end that is obtained by the terminal is relatively low or even the terminal cannot obtain an absolute position of the terminal or the peer end, the obtained relative position between the terminal and the peer end has relatively low precision, and even the relative position between the terminal and the peer end cannot be determined.

To achieve the foregoing objective, the following technical solutions are used in embodiments of this application:

According to a first aspect, a relative positioning method is provided. A first terminal obtains a plurality of first relative positions determined based on a second relative position and a third relative position, and processes the plurality of first relative positions to obtain a relative position between the first terminal and a second terminal. The first relative position is an initial relative position between the first terminal and the second terminal. The second relative position is a relative position between the first terminal and a reference point. The third relative position is a relative position between the second terminal and the reference point.

Based on the method in the first aspect, the first terminal does not need to obtain an absolute position of the first terminal and an absolute position of the second terminal, and may determine the relative position between the first terminal and the second terminal based on the relative position between the first terminal and the reference point and the relative position between the second terminal and the reference point. In addition, the first terminal may obtain a more accurate relative position between the first terminal and the second terminal by processing the plurality of obtained initial relative positions between the first terminal and the second terminal.

In an embodiment, the first terminal may send a first message used to request to obtain a plurality of third relative positions to the second terminal, receive the plurality of third relative positions from the second terminal, and process the plurality of third relative positions and a plurality of second relative positions to obtain the plurality of first relative positions. Alternatively, the first terminal may send a first message used to request to obtain a plurality of third relative positions to a plurality of reference points, receive the plurality of third relative positions from the plurality of reference points, and process the plurality of third relative positions and a plurality of second relative positions to obtain the plurality of first relative positions.

In this embodiment, the first terminal may obtain the plurality of third relative positions from the second terminal, or may obtain the third relative positions from the plurality of reference points. This provides a feasible solution for the first terminal to obtain the first relative position based on the second relative position and the third relative position.

In an embodiment, when the first terminal sends the first message to the second terminal, the first message may include identity information of the plurality of reference points. Alternatively, when the first terminal sends the first message to the plurality of reference points, the first message may include identity information of the second terminal.

In this embodiment, when the first terminal obtains the plurality of third relative positions from the second terminal, the plurality of reference points are specified, so that the second terminal sends only a third relative position between the second terminal and the reference point to the first terminal. This prevents the first terminal from receiving a relative position between the second terminal and another terminal that is not a reference point, to reduce processing load of the first terminal. Alternatively, when the first terminal obtains the third relative position from the reference point, the second terminal is specified, so that the reference point sends only a third relative position between the reference point and the second terminal to the first terminal. This prevents the first terminal from receiving the relative position between a reference point and a terminal other than the second terminal, to reduce processing load of the first terminal.

In an embodiment, when the first terminal sends the first message to the second terminal, the first message may further include a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times. Alternatively, when the first terminal sends the first message to the plurality of reference points, the first message may further include a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In this embodiment, the first terminal sets the first trigger condition, so that a quantity of signaling interworking times between the first terminal and the second terminal or between the first terminal and the plurality of reference points can be reduced, thereby reducing communication load.

In an embodiment the first terminal sends, to the plurality of reference points, a second message used to request to obtain the plurality of first relative positions, and receives the plurality of first relative positions from the plurality of reference points. Alternatively, the first terminal sends, to a server, a second message used to request to obtain the plurality of first relative positions, and receives the plurality of first relative positions from the server.

In this embodiment, the first terminal obtains the plurality of first relative positions from the plurality of reference points or the server, so that calculation load of the first terminal can be reduced.

In an embodiment, the second message may include identity information of the second terminal.

In this embodiment, when the first terminal obtains the plurality of first relative positions from a second network element, the second terminal is specified, so that the second network element sends only a first relative position between the first terminal and the second terminal to the first terminal. This prevents the first terminal from receiving a relative position between the first terminal and another terminal other than the second terminal, to reduce processing load of the first terminal.

In an embodiment, when the first terminal sends the second message to the plurality of reference points, the second message may further include a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times. Alternatively, when the first terminal sends the second message to the server, the second message may further include a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In this embodiment, the first terminal sets the second trigger condition, so that a quantity of signaling interworking times between the first terminal and the plurality of reference points or between the first terminal and the server can be reduced, thereby reducing communication load.

In an embodiment, the first terminal may perform weighting processing on the plurality of first relative positions to obtain the relative position between the first terminal and the second terminal. Alternatively, the first terminal may process the plurality of first relative positions by using a preset probability distribution model, to obtain the relative position between the first terminal and the second terminal.

In this embodiment, the first terminal can obtain a more accurate relative position between the first terminal and the second terminal by processing the plurality of first relative positions.

In an embodiment, the relative position may include a length and an angle. The length is a length of a line segment that is between two terminals corresponding to the relative position, and the angle is an included angle formed between a straight line on which the two terminals are located and a normal line along an angle direction, where the normal line is a straight line in a preset direction, and the angle direction is a clockwise direction or a counterclockwise direction.

In this embodiment, a unified standard is used for the relative position, so that each terminal determines and processes the relative position.

According to a second aspect, a relative positioning method is provided. A second terminal receives, from a first terminal, a first message used to request to obtain a plurality of third relative positions. The second terminal sends, based on the first message, the plurality of third relative positions to the first terminal. The third relative position is a relative position between the second terminal and a reference point.

Based on the method in the second aspect, after receiving the first message sent by the first terminal, the second terminal sends the plurality of third relative positions to the first terminal, so that a feasible solution is provided for the first terminal to obtain a first relative position based on a second relative position and the third relative position.

In an embodiment, the first message may include identity information of a plurality of reference points and/or a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times.

In this embodiment, the second terminal sends only the third relative position between the second terminal and the reference point to the first terminal. This can prevent the first terminal from receiving a relative position between the second terminal and another terminal that is not a reference point, and reduce processing load of the first terminal. The second terminal sends the plurality of third relative positions to the first terminal when the first trigger condition is met, so that a quantity of signaling interworking times between the second terminal and the first terminal can be reduced, and communication load can be reduced.

According to a third aspect, a relative positioning method is provided. The method may include: Each of a plurality of reference points receives, from a first terminal, a first message used to request to obtain a third relative position. The reference point sends a plurality of third relative positions to the first terminal based on the first message. The third relative position is a relative position between a second terminal and the reference point.

Based on the method in the third aspect, after receiving the first message sent by the first terminal, Each of the plurality of reference points sends the third relative position to the first terminal, so that a feasible solution is provided for the first terminal to obtain a first relative position based on a second relative position and the third relative position.

In this embodiment, the first message may include identity information of the second terminal and/or a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In this embodiment, each of the plurality of reference points sends only the third relative position between the second terminal and the reference point to the first terminal. This can prevent the first terminal from receiving a relative position between the reference point and the terminal other than the second terminal, and reduce processing load of the first terminal. The plurality of reference points send the plurality of third relative positions to the first terminal when the first trigger condition is met, so that a quantity of signaling interworking times between the second terminal and the first terminal can be reduced, and communication load can be reduced.

According to a fourth aspect, a relative positioning method is provided. Each of a plurality of reference points receives, from a first terminal, a second message used to request to obtain a first relative position. The reference point sends a plurality of first relative positions to the first terminal based on the second message. The first relative position is an initial relative position between the first terminal and a second terminal.

Based on the method according to the fourth aspect, the plurality of reference points directly send the plurality of first relative positions to the first terminal, so that calculation load of the first terminal can be reduced.

In an embodiment, the second message may include identity information of the second terminal and/or a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times.

In this embodiment, the plurality of reference points sends, based on the second message, only the first relative position between the first terminal and the second terminal to the first terminal. This can prevent the first terminal from receiving a relative position between the first terminal and another terminal other than the second terminal, and reduce processing load of the first terminal. The plurality of reference points send the plurality of first relative positions to the first terminal when the second trigger condition is met, so that a quantity of signaling interworking times between the first terminal and the plurality of reference points can be reduced, and communication load can be reduced.

According to a fifth aspect, a relative positioning method is provided. The method may include: A server receives, from a first terminal, a second message used to request to obtain a plurality of first relative positions. The server sends the plurality of first relative positions to the first terminal based on the second message. The first relative position is an initial relative position between the first terminal and a second terminal.

Based on the method according to the fifth aspect, the server directly sends the plurality of first relative positions to the first terminal, so that calculation load of the first terminal can be reduced.

In an embodiment, the second message may include identity information of the second terminal and/or a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In this embodiment, the server sends, based on the second message, only the first relative position between the first terminal and the second terminal to the first terminal. This can prevent the first terminal from receiving a relative position between the first terminal and another terminal other than the second terminal, and reduce processing load of the first terminal. The server sends the plurality of first relative positions to the first terminal when the second trigger condition is met, so that a quantity of signaling interworking times between the first terminal and the server can be reduced, and communication load can be reduced.

According to a sixth aspect, a communication apparatus is provided. The communication apparatus may implement functions performed by the first terminal in the first aspect or the possible designs of the first aspect, and the functions may be implemented by hardware by executing corresponding software. The hardware or the software includes one or more modules corresponding to the function. For example, the communication apparatus includes a processing module.

The processing module is configured to obtain a plurality of first relative positions determined based on a second relative position and a third relative position. The first relative position is an initial relative position between a first terminal and a second terminal. The second relative position is a relative position between the first terminal and a reference point. The third relative position is a relative position between the second terminal and the reference point.

The processing module is further configured to process the plurality of first relative positions obtained by an obtaining module, to obtain a relative position between the first terminal and the second terminal.

For a specific implementation of the communication apparatus, refer to behavior functions of the first terminal in the relative positioning method provided in the first aspect or any possible design of the first aspect. Based on the communication apparatus in the sixth aspect, the first terminal does not need to obtain an absolute position of the first terminal and an absolute position of the second terminal, and may determine the relative position between the first terminal and the second terminal based on the relative position between the first terminal and the reference point and the relative position between the second terminal and the reference point. In addition, the first terminal may obtain a more accurate relative position between the first terminal and the second terminal by processing the plurality of obtained initial relative positions between the first terminal and the second terminal.

In an embodiment, the communication apparatus further includes a sending module. The sending module is configured to send a first message used to request to obtain a plurality of third relative positions to the second terminal.

The processing module is further configured to: receive the plurality of third relative positions from the second terminal, and process the plurality of third relative positions and a plurality of second relative positions to obtain the plurality of first relative positions. Alternatively, the sending module is configured to send a first message used to request to obtain a plurality of third relative positions to a plurality of reference points. The processing module is further configured to: receive the plurality of third relative positions from the plurality of reference points, and process the plurality of third relative positions and a plurality of second relative positions to obtain the plurality of first relative positions.

In this embodiment, the first terminal may obtain the plurality of third relative positions from the second terminal, or may obtain the third relative positions from the plurality of reference points. This provides a feasible solution for the first terminal to obtain the first relative position based on the second relative position and the third relative position.

In an embodiment, when the sending module sends the first message to the second terminal, the first message may include identity information of the plurality of reference points. Alternatively, when the sending module sends the first message to the plurality of reference points, the first message may include identity information of the second terminal.

In this embodiment, when the first terminal obtains the plurality of third relative positions from the second terminal, the plurality of reference points are specified, so that the second terminal sends only a third relative position between the second terminal and the reference point to the first terminal. This prevents the first terminal from receiving a relative position between the second terminal and another terminal that is not a reference point, to reduce processing load of the first terminal. Alternatively, when the first terminal obtains the third relative position from the reference point, the second terminal is specified, so that the reference point sends only a third relative position between the reference point and the second terminal to the first terminal. This prevents the first terminal from receiving the relative position between a reference point and a terminal other than the second terminal, to reduce processing load of the first terminal.

In an embodiment, when the sending module sends the first message to the second terminal, the first message may further include a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times. Alternatively, when the sending module sends the first message to the plurality of reference points, the first message may further include a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In this embodiment, the first terminal sets the first trigger condition, so that a quantity of signaling interworking times between the first terminal and the second terminal or between the first terminal and the plurality of reference points can be reduced, thereby reducing communication load.

In an embodiment, the sending module is further configured to send, to the plurality of reference points, a second message used to request to obtain the plurality of first relative positions. The obtaining module is further configured to receive the plurality of first relative positions from the plurality of reference points. Alternatively, the sending module is further configured to send, to a server, a second message used to request to obtain the plurality of first relative positions. The obtaining module is further configured to receive the plurality of first relative positions from the server.

In this embodiment, the first terminal obtains the plurality of first relative positions from the plurality of reference points or the server, so that calculation load of the first terminal can be reduced.

In an embodiment, the second message may include identity information of the second terminal.

In this embodiment, when the first terminal obtains the plurality of first relative positions from a second network element, the second terminal is specified, so that the second network element sends only a first relative position between the first terminal and the second terminal to the first terminal. This prevents the first terminal from receiving a relative position between the first terminal and another terminal other than the second terminal, to reduce processing load of the first terminal.

In an embodiment, when the sending module sends the second message to the plurality of reference points, the second message may further include a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times. Alternatively, when the sending module sends the second message to the server, the second message may further include a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In this embodiment, the first terminal sets the second trigger condition, so that a quantity of signaling interworking times between the first terminal and the plurality of reference points or between the first terminal and the server can be reduced, thereby reducing communication load.

In this embodiment, the processing module is further configured to: perform weighting processing on the plurality of first relative positions to obtain the relative position between the first terminal and the second terminal, or process the plurality of first relative positions by using a preset probability distribution model, to obtain the relative position between the first terminal and the second terminal.

In this embodiment, the first terminal can obtain a more accurate relative position between the first terminal and the second terminal by processing the plurality of first relative positions.

In an embodiment, the relative position includes a length and an angle. The length is a length of a line segment that is between two terminals corresponding to the relative position, and the angle is an included angle formed between a straight line on which the two terminals are located and a normal line along an angle direction, where the normal line is a straight line in a preset direction, and the angle direction is a clockwise direction or a counterclockwise direction.

In this embodiment, a unified standard is used for the relative position, so that each terminal determines and processes the relative position.

According to a seventh aspect, a communication apparatus is provided. The communication apparatus may implement functions performed by the second terminal in the second aspect or the possible designs of the second aspect, and the functions may be implemented by hardware by executing corresponding software. The hardware or the software includes one or more modules corresponding to the function. For example, the communication apparatus includes a receiving module and a sending module.

The receiving module is configured to receive, from a first terminal, a first message used to request to obtain a plurality of third relative positions. The third relative position is a relative position between a second terminal and a reference point.

The sending module is configured to send the plurality of third relative positions to the first terminal.

For a specific implementation of the communication apparatus, refer to behavior functions of the second terminal in the relative positioning method provided in the second aspect or any possible design of the second aspect. Based on the communication apparatus in the seventh aspect, after receiving the first message sent by the first terminal, the second terminal sends the plurality of third relative positions to the first terminal, so that a feasible solution is provided for the first terminal to obtain a first relative position based on a second relative position and the third relative position.

In an embodiment, the first message may include identity information of a plurality of reference points and/or a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times.

In this embodiment, the second terminal sends only the third relative position between the second terminal and the reference point to the first terminal. This can prevent the first terminal from receiving a relative position between the second terminal and another terminal that is not a reference point, and reduce processing load of the first terminal. The second terminal sends the plurality of third relative positions to the first terminal when the first trigger condition is met, so that a quantity of signaling interworking times between the second terminal and the first terminal can be reduced, and communication load can be reduced.

According to an eighth aspect, a communication apparatus is provided. The communication apparatus may implement functions performed by each of the plurality of reference points in the third aspect or the possible designs of the third aspect, and the functions may be implemented by hardware by executing corresponding software. The hardware or the software includes one or more modules corresponding to the function. For example, the communication apparatus includes a receiving module and a sending module.

The receiving module is configured to receive, from a first terminal, a first message used to request to obtain a third relative position. The third relative position is a relative position between a second terminal and a reference point.

The sending module is configured to send a plurality of third relative positions to the first terminal.

For a specific implementation of the communication apparatus, refer to behavior functions of the reference point in the relative positioning method provided in the third aspect or any possible design of the third aspect. Based on the communication apparatus in the eighth aspect, after receiving the first message sent by the first terminal, the plurality of reference points send the plurality of third relative positions to the first terminal, so that a feasible solution is provided for the first terminal to obtain a first relative position based on a second relative position and the third relative position.

In an embodiment, the first message may include identity information of the second terminal and/or a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In this embodiment, the plurality of reference points send only the third relative position between the second terminal and the reference point to the first terminal. This can prevent the first terminal from receiving a relative position between the second terminal and another terminal that is not a reference point, and reduce processing load of the first terminal. The plurality of reference points send the plurality of third relative positions to the first terminal when the first trigger condition is met, so that a quantity of signaling interworking times between the second terminal and the first terminal can be reduced, and communication load can be reduced.

According to a ninth aspect, a communication apparatus is provided. The communication apparatus may implement functions performed by each of the plurality of reference points in the fourth aspect or the possible designs of the fourth aspect, and the functions may be implemented by hardware by executing corresponding software. The hardware or the software includes one or more modules corresponding to the function. For example, the communication apparatus includes a receiving module and a sending module.

The receiving module is configured to receive, from a first terminal, a second message used to request to obtain a first relative position. The first relative position is an initial relative position between a first terminal and a second terminal.

The sending module is configured to send a plurality of first relative positions to the first terminal.

For a specific implementation of the communication apparatus, refer to behavior functions of the plurality of reference points in the relative positioning method provided in the fourth aspect or any possible design of the fourth aspect. Based on the communication apparatus in the ninth aspect, the plurality of reference points directly send the plurality of first relative positions to the first terminal, so that calculation load of the first terminal can be reduced.

In an embodiment, the second message may include identity information of the second terminal and/or a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times.

In this embodiment, the plurality of reference points sends, based on the second message, only the first relative position between the first terminal and the second terminal to the first terminal. This can prevent the first terminal from receiving a relative position between the first terminal and another terminal other than the second terminal, and reduce processing load of the first terminal. The plurality of reference points send the plurality of first relative positions to the first terminal when the second trigger condition is met, so that a quantity of signaling interworking times between the first terminal and the plurality of reference points can be reduced, and communication load can be reduced.

According to a tenth aspect, a communication apparatus is provided. The communication apparatus may implement functions performed by the server in the fifth aspect or the possible designs of the fifth aspect, and the functions may be implemented by hardware by executing corresponding software. The hardware or the software includes one or more modules corresponding to the function. For example, the communication apparatus includes a receiving module and a sending module.

The receiving module is configured to receive, from a first terminal, a second message used to request to obtain a plurality of first relative positions. The first relative position is an initial relative position between a first terminal and a second terminal.

The sending module is configured to send a plurality of first relative positions to the first terminal.

For a specific implementation of the communication apparatus, refer to behavior functions of the server in the relative positioning method provided in the fifth aspect or any possible design of the fifth aspect. Based on the communication apparatus in the tenth aspect, the server directly sends the plurality of first relative positions to the first terminal, so that calculation load of the first terminal can be reduced.

In an embodiment, the second message may include identity information of the second terminal and/or a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In this embodiment, the server sends, based on the second message, only the first relative position between the first terminal and the second terminal to the first terminal. This can prevent the first terminal from receiving a relative position between the first terminal and another terminal other than the second terminal, and reduce processing load of the first terminal. The server sends the plurality of first relative positions to the first terminal when the second trigger condition is met, so that a quantity of signaling interworking times between the first terminal and a plurality of reference points can be reduced, and communication load can be reduced.

According to an eleventh aspect, a communication apparatus is provided. The communication apparatus includes one or more processors and one or more memories, the one or more memories are coupled to the one or more processors, and the one or more memories are configured to store computer program code or computer instructions. When the one or more processors execute the computer instructions, the communication apparatus is enabled to perform the relative positioning method according to the first aspect or any possible design of the first aspect, or perform the relative positioning method according to the second aspect or any possible design of the second aspect; or, performing the relative positioning method according to the third aspect or any possible design of the third aspect, or performing the relative positioning method according to the fourth aspect or any possible design of the fourth aspect; or, performing the relative positioning method according to the fifth aspect or any possible design of the fifth aspect.

According to a twelfth aspect, a computer-readable storage medium is provided. The computer-readable storage medium stores computer instructions or a program. When the computer instructions or the program runs on a computer, the computer is enabled to perform the relative positioning method according to the first aspect or any possible design of the first aspect, or perform the relative positioning method according to the second aspect or any possible design of the second aspect, or perform the relative positioning method according to the third aspect or any possible design of the third aspect, or perform the relative positioning method according to the fourth aspect or any possible design of the fourth aspect, or perform the relative positioning method according to the fifth aspect or any possible design of the fifth aspect.

According to a thirteenth aspect, a computer program product including instructions is provided. When the computer program product runs on a computer, the computer is enabled to perform the relative positioning method according to any one of the first aspect or the possible designs of the first aspect; or, performing the relative positioning method according to the second aspect or any possible design of the second aspect, or performing the relative positioning method according to the third aspect or any possible design of the third aspect; or, performing the relative positioning method according to any one of the fourth aspect or the possible designs of the fourth aspect, or performing the relative positioning method according to any one of the fifth aspect or the possible designs of the fifth aspect.

For a technical effect achieved in any one of the eleventh aspect to the thirteenth aspect, refer to the technical effect achieved in any possible design of the first aspect to the fifth aspect. Details are not described herein again.

According to a fourteenth aspect, a communication system is provided. The communication system includes the communication apparatus according to the sixth aspect or any possible design of the sixth aspect and the communication apparatus according to the seventh aspect or any possible design of the seventh aspect, or includes the communication apparatus according to the sixth aspect or any possible design of the sixth aspect and the communication apparatus according to the eighth aspect or any possible design of the eighth aspect, or includes the communication apparatus according to the sixth aspect or any possible design of the sixth aspect and the communication apparatus according to the ninth aspect or any possible design of the ninth aspect, or includes the communication apparatus according to any one of the sixth aspect or the possible designs of the sixth aspect and the communication apparatus according to any one of the tenth aspect or the possible designs of the tenth aspect.

DESCRIPTION OF EMBODIMENTS

The following describes implementations of embodiments of this application in detail with reference to accompanying drawings in this specification.

Relative positioning methods provided in embodiments of this application may be used for any communication system that supports V2X communication. The communication system may be a 3rd Generation Partnership Project (3GPP) communication system, for example, a long term evolution (LTE) system, or may be a 5th generation (5G) mobile communication system, a new radio (NR) system, an NR V2X system, or another next-generation communication system, or may be a non-3GPP communication system. This is not limited. The following uses FIG. 1 as an example to describe a relative positioning method provided in embodiments of this application.

Figure 1:
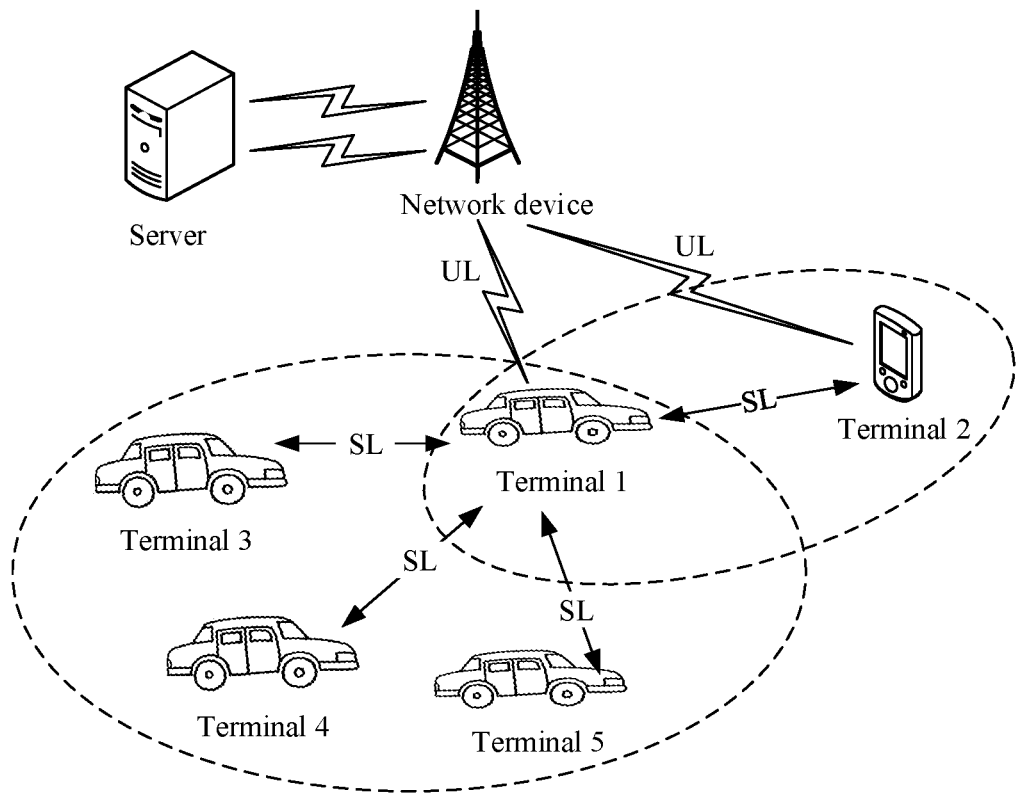
FIG. 1 is a simplified schematic diagram of a communication system according to an embodiment of the present application.

FIG. 1 is a schematic diagram of a communication system according to an embodiment of this application. As shown in FIG. 1, the communication system may include a plurality of terminals, a network device, and a server. A terminal may be located within cell coverage of the network device, or may be located outside cell coverage of the network device. The terminal may perform air interface communication with the network device over an uplink (UL). The terminal sends service data to the network device over the UL. The network device forwards the received service data to the server. The server processes the service data, and delivers the processed service data to the terminal through the network device. For example, the terminal sends uplink data to the network device over the UL on a physical uplink shared channel (PUSCH), the network device forwards the received uplink data to the server, and the server processes the uplink data, and delivers the processed uplink data to the terminal by using the network device. The network device that forwards the uplink data from the terminal to the server and the network device that forwards the downlink data from the server to the terminal may be a same network device, or may be different network devices, and may be determined by the server.

Alternatively, the terminal may perform sidelink communication with another terminal over a sidelink (SL), and send service data to the another terminal over the SL. For example, the terminal sends the sidelink data to another terminal over the SL on a physical sidelink shared channel (PSSCH), sends sidelink feedback control information (SFCI) corresponding to the received sidelink data to another terminal over the SL on a physical sidelink feedback channel (PSFCH). In embodiments of this application, sidelink communication may include vehicle to vehicle V2V communication, vehicle to pedestrian V2P communication, vehicle to infrastructure V2I communication, and the like. This is not limited.

The server in FIG. 1 may be a V2X application server, a server having a location management function (LMF), a base station providing a positioning function, or the like. This is not limited. The server may be configured to provide a service for the terminal, monitor a position of the terminal, and the like.

The network device in FIG. 1 may be any device having a wireless transceiver function, and is mainly configured to implement functions such as a radio physical control function, resource scheduling and radio resource management, radio access control, and mobility management. Specifically, the network device may be an access network (AN) device/a radio access network (RAN) device, or may be a device including a plurality of 5G-AN/5G-RAN nodes, or may be a NodeB (NB), an evolved NodeB (eNB), a next generation NodeB (gNB), a transmission reception point (TRP), a transmission point (TP), a road side unit (RSU), any node in another type of access node, or the like. This is not limited.

The terminal in FIG. 1 may be referred to as user equipment (UE), a mobile station (MS), a mobile terminal (MT), or the like. Specifically, the terminal in FIG. 1 may be a mobile phone, a tablet computer, or a computer having a wireless transceiver function. Alternatively, the terminal may be a virtual reality VR) terminal, an augmented reality (AR) terminal, a wireless terminal in industrial control, a wireless terminal in unmanned driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communication capability, an intelligent connected vehicle, or the like. This is not limited. The terminal, the network device, and the server in embodiments of this application each may be one or more chips, or may be a system-on-a-chip (SOC), or the like.

It should be noted that FIG. 1 is merely an example drawing, and a quantity of devices included in FIG. 1 is not restricted. In addition, in addition to the devices shown in FIG. 1, the communication system may further include another device. Names of the devices and names of links in FIG. 1 are not limited. In addition to the names shown in FIG. 1, the devices and the links may have other names. For example, a terminal communicates with a network device through a user equipment interface (Uu). The UL may also be named a Uu link or the like. The terminal and another terminal are directly connected for communication through a direct communication interface PC5 interface. The SL may also be named a PC5 link, a direct link, or the like. This is not limited.

Figure 1A:
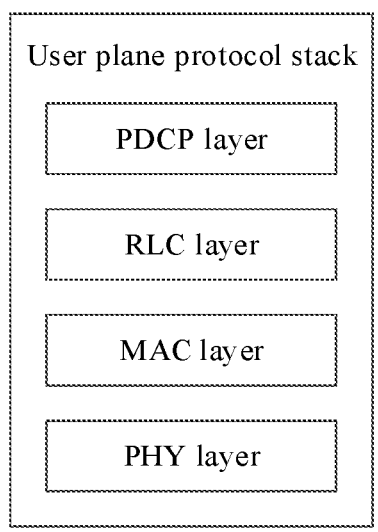
FIG. 1a is a simplified schematic diagram of a user plane protocol stack according to an embodiment of the present application.
Figure 1B:
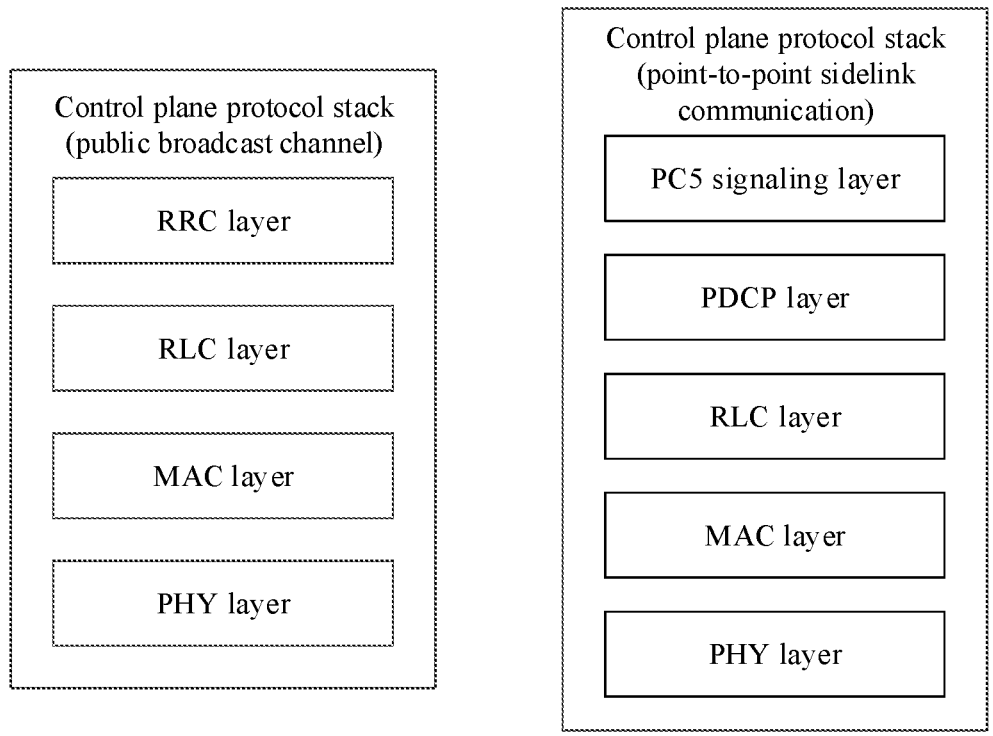
FIG. 1b is a simplified schematic diagram of a control plane protocol stack according to an embodiment of the present application.

In the communication system shown in FIG. 1, communication is performed between a terminal and another terminal through a PC5 interface. To support communication between the terminals through the PC5 interface, a control plane protocol stack and a user plane protocol stack may be set inside the terminal. As shown in FIG. 1a, the user plane protocol stack includes a packet data convergence protocol (PDCP) layer, a radio link control (RLC) layer, a media access control (MAC) layer, and a physical (PHY) layer. As shown in FIG. 1B, a control plane protocol stack includes a control plane protocol stack of a common broadcast channel and a control plane protocol stack of point-to-point sidelink communication. The control plane protocol stack of the common broadcast channel includes a radio resource control (RRC) layer, an RLC layer, a MAC layer and a PHY layer. The control plane protocol stack of the point-to-point sidelink communication includes a PC5 signaling layer, a PDCP layer, an RLC layer, a MAC layer, and a PHY layer.

Currently, in the communication system shown in FIG. 1, when the terminal obtains a relative position between the terminal and another terminal, the terminal obtains an absolute position of the terminal and an absolute position of a peer end, and performs calculation on the absolute position of the terminal and the absolute position of the peer end to obtain the absolute positions of the terminal and the peer end. In this process, the two terminals need to respectively perform GPS positioning to determine the absolute positions. However, in some scenarios, precision of an absolute position of a terminal or a peer end obtained by the terminal is low, or even the absolute position of the terminal or the peer end cannot be obtained, and the reason may be, for example, that a GPS signal of the terminal is shielded. A relative position between the terminal and the peer end obtained by the terminal has low precision, or even the relative position between the terminal and the peer end cannot be determined.

To resolve this problem, an embodiment of this application provides a relative positioning method. A plurality of initial relative positions between a terminal and a peer end are obtained by using a plurality of reference points based on relative positions between the terminal and the plurality of reference points and relative positions between a peer end and the plurality of reference points, and the plurality of initial relative positions are processed. In this way, the terminal can obtain a relative position between the terminal and the peer end without obtaining an absolute position of the terminal and an absolute position of the peer end. Specifically, in the process, refer to descriptions in the following embodiments corresponding to FIG. 3 or FIG. 5 to FIG. 8.

In embodiments of this application, a relative position between two devices may be: with one of the two devices as a reference object, a displacement of the other device relative to the reference object. The displacement may include a length and an angle. The length is a length of a line segment between the two devices. The angle is an included angle formed between a straight line on which the two devices are located along an angle direction and a normal line. The normal line is a straight line in a preset direction. The angle direction is a clockwise direction or a counter-clockwise direction. The preset direction may be any geographic direction such as due north, due south, due east, due west, due southeast, or due southwest. This is not limited.

Figure 1C:
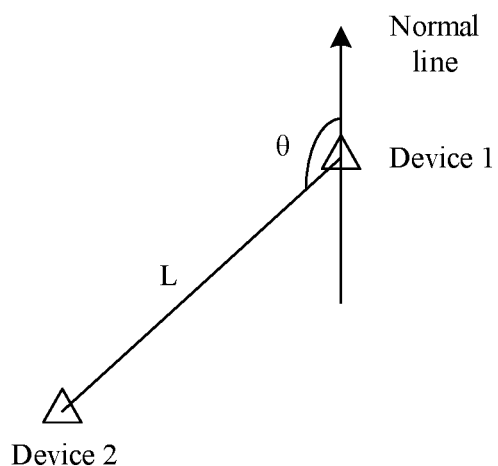
FIG. 1c is a schematic diagram of a relative position between devices according to an embodiment of the present application.

For example, FIG. 1c is a schematic diagram of a relative position between a device 1 and a device 2. That a due north direction is a normal direction, and an inverse timing direction is an angle direction is used as an example. A length L of a line segment between the device 1 and the device 2 is a length of the relative position between the device 1 and the device 2. An angle $\theta$ is an angle of the relative position between the device 1 and the device 2.

Figure 2:
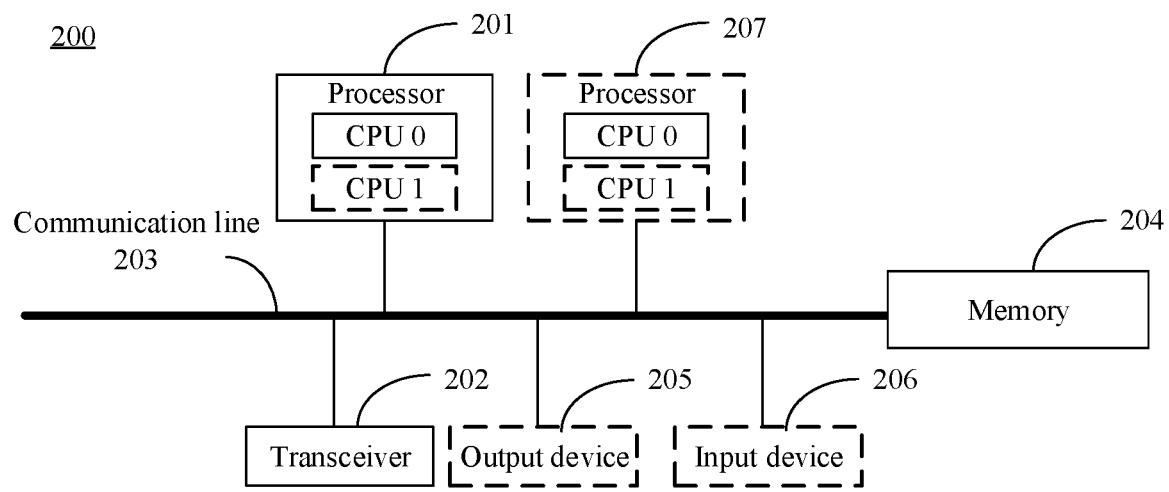
FIG. 2 is a schematic composition diagram of a communication apparatus according to an embodiment of this application.

In an embodiment, each device shown in FIG. 1, for example, each terminal and the server, may use a composition structure shown in FIG. 2, or include components shown in FIG. 2. FIG. 2 is a schematic composition diagram of a communication apparatus 200 according to an embodiment of this application. The communication apparatus 200 may be a first terminal, a chip, or a system-on-a-chip in the first terminal. Alternatively, the communication apparatus 200 may be a second terminal, a chip, or a system-on-a-chip in the second terminal. Alternatively, the communication apparatus 200 may be a server, a chip in the server, or a system-on-a-chip. As shown in FIG. 2, the communication apparatus 200 includes a processor 201, a transceiver 202, and a communication line 203.

Further, the communication apparatus 200 may include a memory 204. The processor 201, the memory 204, and the transceiver 202 may be connected to each other through the communication line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communication network. The another communication network may be the Ethernet, a radio access network (RAN), a wireless local area network (WLAN), or the like. The transceiver 202 may be a module, a circuit, a transceiver, or any apparatus that can implement communication.

The communication line 203 is used to transmit information between components included in the communication apparatus 200.

The memory 204 is configured to store instructions. The instructions may be a computer program.

The memory 204 may be a read-only memory (ROM) or another type of static storage device that can store static information and/or instructions, or may be a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located inside the communication apparatus 200, or may be located outside the communication apparatus 200. This is not limited. The processor 201 is configured to execute the instructions stored in the memory 204, to implement the relative positioning method provided in the following embodiments of this application.

In an example, the processor 201 may include one or more CPUs, for example, a CPU 0 and a CPU 1 in FIG. 2.

In an optional implementation, the communication apparatus 200 includes a plurality of processors. For example, in addition to the processor 201 in FIG. 2, the communication apparatus 200 may further include a processor 207.

In an embodiment, the communication apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the communication apparatus 200 may be a desktop computer, a portable computer, a network server, a mobile phone, a tablet computer, a wireless terminal, an embedded device, a chip system, or a device with a structure similar to that in FIG. 2. In addition, the composition structure shown in FIG. 2 does not constitute a limitation on the terminal. In addition to the components shown in FIG. 2, the terminal may include more or fewer components than those shown in the figure, or combine some components, or have different component arrangements.

In embodiments of this application, a chip system may include a chip, or may include a chip and another discrete component.

In addition, mutual reference may be made to actions, terms, and the like in embodiments of this application. This is not limited. In embodiments of this application, names of messages exchanged between devices, names of parameters in the messages, or the like are merely examples. In specific implementation, other names may alternatively be used. This is not limited.

With reference to the communication system shown in FIG. 1, the following describes relative positioning methods provided in embodiments of this application by using an example of obtaining a relative position between a first terminal and a second terminal. The first terminal may be any terminal in FIG. 1, and the second terminal may be any terminal other than the first terminal in FIG. 1. The first terminal, the second terminal, a reference point, and a server described in the following embodiments may have the components shown in FIG. 2.

Figure 3:
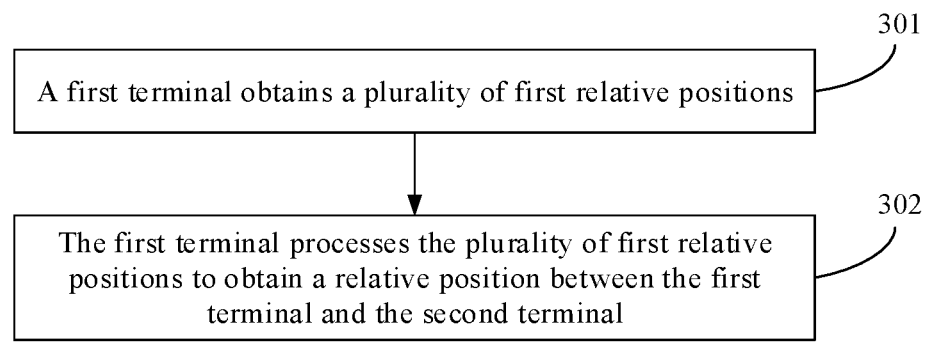
FIG. 3 is a schematic diagram of a relative positioning method according to an embodiment of the present application.

FIG. 3 shows a relative positioning method according to an embodiment of this application. The method may be used to resolve a problem that when precision of an absolute position of a terminal or a peer end that is obtained by the terminal is low or even the terminal cannot obtain an absolute position of the terminal or the peer end, an obtained relative position between the terminal and the peer end has low precision, or even a relative position between the terminal and the peer end cannot be determined. As shown in FIG. 3, the method may include the following operations.

Operation 301: A first terminal obtains a plurality of first relative positions.

The first relative position may be an initial relative position between the first terminal and the second terminal, and the first relative position may be determined based on a second relative position and a third relative position. The second relative position may be a relative position between the first terminal and a reference point. The third relative position may be a relative position between the second terminal and the reference point. The reference point may be a terminal that is in FIG. 1 and that is in communication connection with both the first terminal and the second terminal through a PC5 interface, or may be a terminal that can simultaneously obtain a relative position between the first terminal and the terminal and a relative position between the second terminal and the terminal.

For example, the first relative position may meet the following formula:

First relative position=$f$(Second relative position, Third relative position); (Formula 1)

$f$ is a preset function, and the preset function f may be constructed by using trigonometric function knowledge. The second relative position and the third relative position are processed by using the preset function f, to obtain the first relative position.

For example, a second relative position between the first terminal and the reference point is (L1, θ1), and a third relative position between the second terminal and the reference point is (L2, θ2). An included angle θ between a line segment corresponding to L1 and a line segment corresponding to L2 may be determined based on θ1 and θ2, and a length L3 of the first relative position may be obtained based on L1, L2, and the included angle θ by using the cosine theorem cos θ=(L1^2+L2^2−L3^2)/(2 L1 L2) in the trigonometric function. A triangle that uses the first terminal, the second terminal, and the reference point as vertexes is constructed based on L1, L2, L3, and the included angle θ. Degrees of inner angles of the triangle are obtained by using the cosine theorem. Based on the degrees of the inner angles and normal directions, an angle θ3 of the first relative position is obtained.

It should be noted that one first relative position may be determined based on one group of (the second relative position, the third relative position), and a plurality of first relative positions may be determined based on a plurality of groups of (the second relative position, the third relative position). The one group of (the second relative position, the third relative position) may be determined based on the one reference point, and different groups of (the second relative position, the third relative position) correspond to different reference points.

Figure 4:
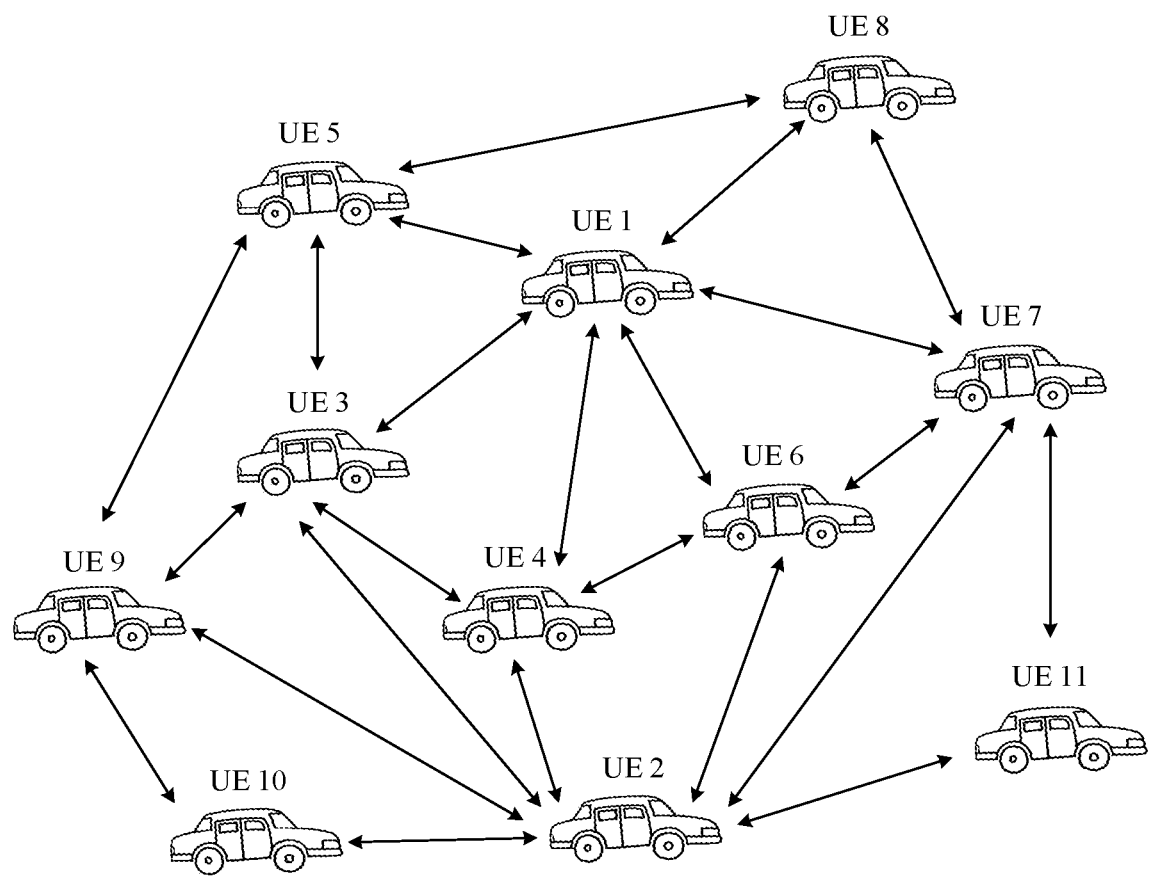
FIG. 4 is a schematic diagram of communication between UEs according to an embodiment of the present application.

For example, FIG. 4 is used as an example. It is assumed that the first terminal is UE 1 in FIG. 4, and the second terminal is UE 2 in FIG. 4. As shown in FIG. 4, UE 1 is separately in communication connection with UE 3, UE 4, UE 5, UE 6, UE 7, and UE 8 through a PC5 interface, and UE 2 is in communication connection with UE 3, UE 4, UE 6, UE 7, UE 9, UE 10 and UE 11 through the PC5 interface. It can be learned from FIG. 4 that the UE 3, the UE 4, the UE 6, and the UE 7 are in communication connection with the UE 1 and the UE 2 through the PC5 interface. Therefore, reference points may include the UE 3, the UE 4, the UE 6, and the UE 7. The second relative position may include a relative position between the UE 1 and the UE 3, a relative position between the UE 1 and the UE 4, a relative position between the UE 1 and the UE 6, and a relative position between the UE 1 and the UE 7. The third relative position may include a relative position between the UE 2 and the UE 3, a relative position between the UE 2 and the UE 4, a relative position between the UE 2 and the UE 6, and a relative position between the UE 2 and the UE 7.

An initial relative position R1 between the UE 1 and the UE 2 is determined based on (a relative position between the UE 1 and the UE 3, a relative position between the UE 2 and the UE 3). An initial relative position R2 between the UE 1 and the UE 2 is determined based on (a relative position between the UE 1 and the UE 4, a relative position between the UE 2 and the UE 4). An initial relative position R3 between the UE 1 and the UE 2 is determined based on (a relative position between the UE 1 and the UE 6, a relative position between the UE 2 and the UE 6). An initial relative position R4 between the UE 1 and the UE 2 is determined based on (a relative position between the UE 1 and the UE 7, a relative position between the UE 2 and the UE 7).

In an example, the first terminal may obtain a plurality of third relative positions from the second terminal or a plurality of reference points, and determine a plurality of first relative positions based on a plurality of third relative positions and a plurality of second relative positions. Specifically, for the method, refer to descriptions in the following embodiment corresponding to FIG. 5 or FIG. 6.

In another example, the first terminal may obtain the plurality of first relative positions from the plurality of reference points or a server. Specifically, for the method, refer to descriptions in the following embodiment corresponding to FIG. 7 or FIG. 8.

Operation 302: The first terminal processes the plurality of first relative positions to obtain a relative position between the first terminal and the second terminal.

In an embodiment, the first terminal performs weighting processing on the plurality of first relative positions based on preset weights, to obtain the relative position between the first terminal and the second terminal.

In an embodiment, the first terminal may establish a weighting model in advance, and perform, by using the weighting model, weighting processing on the plurality of first relative positions corresponding to the plurality of reference points, to obtain the relative position between the first terminal and the second terminal.

For example, the weighting model may meet the following formula:

$$R = \sum_{i=0}^{n} W_1 R_1 + W_2 R_2 + \ldots + W_i R_i + \ldots + W_n R_n; \quad \text{(Formula 2)}$$

R represents the relative position between the first terminal and the second terminal, Ri represents an $i^{th}$ first relative position, and Wi represents a weight corresponding to Ri.

Wi is a preset weight value corresponding to the $i^{th}$ first relative position. The first terminal may set, based on parameters such as a distance and communication quality between each reference point and the first terminal, and a distance and communication quality between each reference point and the second terminal, a corresponding weight for a first relative position corresponding to each reference point. A shorter distance indicates a larger weight, and better communication quality indicates a larger weight. Particularly, the weight of the first relative position corresponding to each reference point may be set to 1/n or the like. This is not limited.

For example, FIG. 4 is used as an example. It is assumed that the first terminal is the UE 1 in FIG. 4, the second terminal is the UE 1 in FIG. 4, and the reference points may include the UE 3, the UE 4, the UE 6, and the UE 7. The plurality of obtained first relative positions include the initial relative position R1, the initial relative position R2, the initial relative position R3, and the initial relative position R4. A weight corresponding to R1 is W1, a weight corresponding to R2 is W2, a weight corresponding to R3 is W3, and a weight corresponding to R4 is W4. A relative position R between the UE 1 and the UE 2=R1 W1+R2 W2+R3 W3+R4 W4.

Further, the first terminal may correct the weighting model. The first terminal may collect statistics about accuracy of the relative position between the first terminal and the second terminal, and properly adjust a weight of the weighting model based on a statistical result, so that the first terminal can process the plurality of first relative positions based on the weighting model, to obtain the accuracy of the relative position between the first terminal and the second terminal.

The relative position between the first terminal and the second terminal that is obtained by using the relative positioning method provided in this embodiment of this application is a relative position obtained through calculation. The relative position between the first terminal and the second terminal may be simultaneously measured to obtain an actual relative position. If a difference between a length of the relative position obtained through calculation and a length of the actual relative position is less than a preset length threshold, and a difference between an angle of the relative position obtained through calculation and an angle of the actual relative position is less than a preset angle threshold, it is considered that the relative position obtained through calculation is accurate.

Further, within a specific quantity of times, a quantity of times that the relative position obtained through calculation is accurate may be counted, and a ratio of the quantity of times that the relative position obtained through calculation is accurate to a total quantity of times of statistics collection is determined as accuracy of the relative position obtained through calculation. When the accuracy is less than a preset accuracy threshold, the weighting model is properly adjusted, to improve accuracy of the relative position obtained through calculation.

In another embodiment, the first terminal processes the plurality of first relative positions by using a preset probability distribution model, to obtain the relative position between the first terminal and the second terminal.

The preset probability distribution model may be used to determine probability distribution of the plurality of first relative positions, and determine a first relative position threshold range based on a probability distribution result. The first relative position threshold range includes a length range and an angle range. A first relative position within the threshold range is reserved based on the first relative position threshold range, and average value calculation or weighting processing is performed on a plurality of reserved first relative positions, to obtain the relative position between the first terminal and the second terminal.

For example, assuming that the plurality of first relative positions between the first terminal and the second terminal include (450 m, 70°), (490 m, 90°), (495 m, 88°), (500 m, 92°), (500 m, 90°), and (510 m, 89°). According to probability distribution, it is determined that a length range is (490 m to 510 m), and an angle range is (88° to 92°). (490 m, 90°), (495 m, 88°), (500 m, 92°), (500 m, 90°), and (510 m, 89°) are reserved based on the length range and the angle range. Averaging processing or weighting processing is performed on the reserved first relative positions, to obtain the relative position between the first terminal and the second terminal.

Further, the first terminal may correct the preset probability distribution model based on a statistical result of the accuracy of the relative position between the first terminal and the second terminal that is obtained by the first terminal, to improve the accuracy of the relative position between the first terminal and the second terminal that is obtained by the first terminal.

Further, after processing the plurality of first relative positions to obtain the relative position between the first terminal and the second terminal, the first terminal may further obtain a relative position with reference to another relative positioning method, for example, obtain a relative position through direct measurement, to further improve positioning accuracy.

Operations 301 and 302 shown in FIG. 3 are merely a process in which the first terminal obtains the relative position between the first terminal and the second terminal at one moment. For example, the first terminal may obtain relative positions between the first terminal and the second terminal at a plurality of moments with reference to the method shown in FIG. 3, predict a moving track of the second terminal in a future period of time based on the relative positions between the first terminal and the second terminal at the plurality of moments, and communicate with the second terminal based on the predicted moving track, to improve user experience.

Based on the method shown in FIG. 3, the first terminal may obtain the relative position between the first terminal and the second terminal by obtaining a plurality of first relative positions and processing the plurality of first relative positions. In this embodiment of this application, the first terminal can obtain the relative position between the first terminal and the second terminal without obtaining an absolute position of the first terminal and an absolute position of the second terminal. In addition, in this embodiment of this application, the first terminal can obtain a more accurate relative position between the first terminal and the second terminal by processing the plurality of initial relative positions between the first terminal and the second terminal, thereby further improving user experience.

Figure 5:
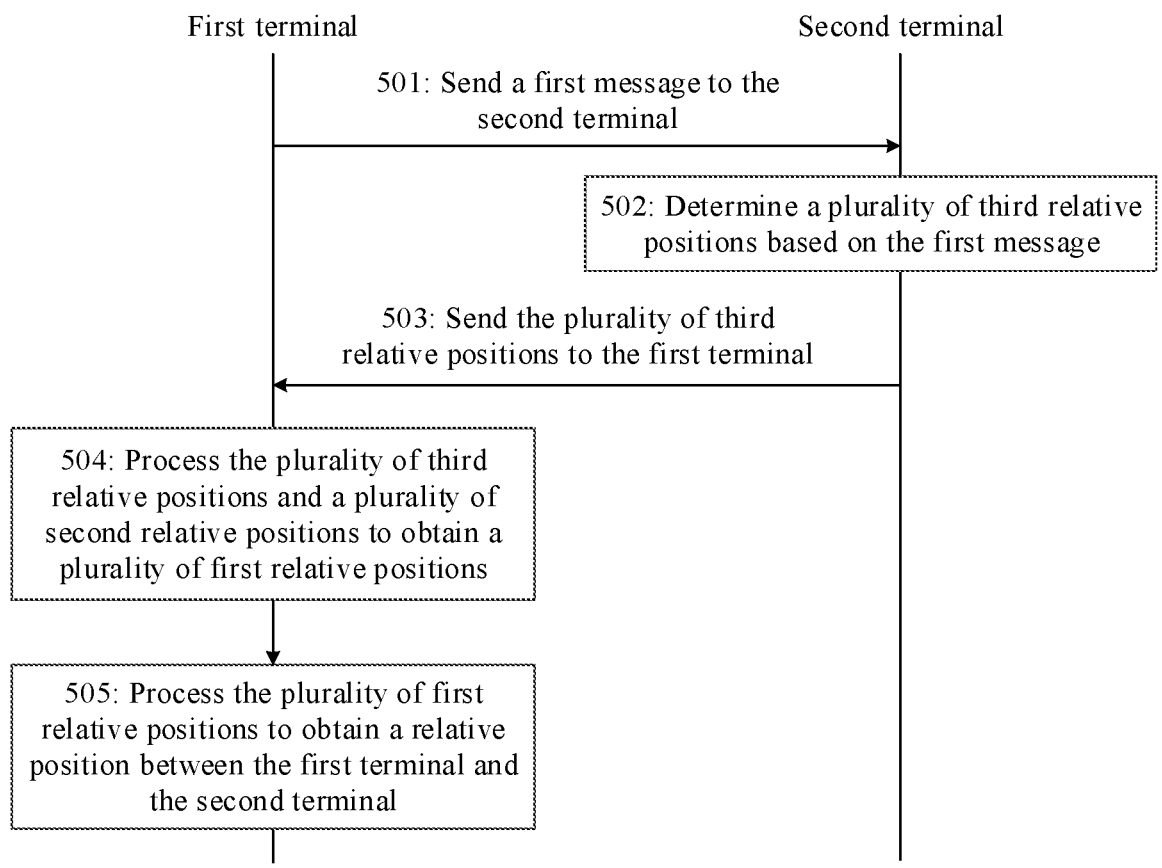
FIG. 5 is a schematic diagram of a relative positioning method according to an embodiment of the present application.

For a process in which the first terminal obtains the plurality of third relative positions from the second terminal and determines the plurality of first relative positions based on the plurality of third relative positions and the plurality of second relative positions in operation 301, refer to FIG. 5. FIG. 5 is a schematic diagram of a relative positioning method according to an embodiment of the application. As shown in FIG. 5, the relative positioning method may include the following operations.

Operation 501: A first terminal sends a first message to a second terminal.

The first message may be used to request to obtain third relative positions of a plurality of reference points.

In an embodiment, the first message may include identity information of the plurality of reference points, and the identity information of the reference point may be used to indicate the reference point. For example, the identity information of the reference point may be an identifier (ID) of the reference point, an IP address of the reference point, or another identifier used to identify the reference point. This is not limited.

The first message may be any one of the following messages: a PC5 signaling message, an RRC message, PHY layer control signaling, PDCP layer control signaling, or MAC layer control signaling.

For example, the first terminal may communicate with the second terminal in advance through a PC5 interface, to request the second terminal to report identity information of all terminals that are in communication connection with the second terminal through the PC5 interface. The first terminal determines, based on the identity information reported by the second terminal and the identity information of all the terminals that are in communication connection with the first terminal through the PC5 interface, identity information of a plurality of reference points that are in communication connection with both the first terminal and the second terminal through the PC5 interface. In addition, the first terminal includes the identity information of the plurality of reference points in the first message, and sends the first message to the second terminal. Alternatively, the reference point is a terminal through which a relative position between the first terminal and a current terminal has been obtained by the first terminal. Alternatively, the reference point is a terminal through which a relative position between the first terminal and a current terminal can be obtained by the first terminal by using another relative positioning method.

In an embodiment, FIG. 4 is used as an example. The first terminal is UE 1, the second terminal is UE 2, the plurality of reference points include UE 3, UE 4, UE 6, and UE 7, and the UE 1 may send the first message to the UE 2. The first message includes identity information of the UE 3, identity information of the UE 4, identity information of the UE 6, and identity information of the UE 7.

Operation 502: The second terminal receives the first message, and determines a plurality of third relative positions.

In an embodiment, determining the plurality of third relative positions based on the identity information of the plurality of reference points that is included in the first message may be performed as follows.

After receiving the first message, the second terminal identifies the plurality of reference points based on the identity information of the plurality of reference points that is included in the first message. For any reference point, if the second terminal has obtained a relative position between the second terminal and the reference point, or may obtain a relative position between the second terminal and the reference point by using another relative positioning method, the second terminal determines that the relative position between the second terminal and the reference point is a third relative position. In other words, the relative position between the second terminal and the reference point needs to be sent to the first terminal in operation 503.

FIG. 4 is used as an example. After receiving the first message sent by the UE 1, the UE 2 identifies, based on the first message, that reference points include the UE 3, the UE 4, the UE 6, and the UE 7. If the UE 2 has obtained a relative position between the UE 2 and the UE 4, a relative position between the UE 2 and the UE 6, and a relative position between the UE 2 and the UE 7, the UE 2 determines that the relative position between the UE 2 and the UE 4, the relative position between the UE 2 and the UE 6, and the relative position between the UE 2 and the UE 7 are the plurality of third relative positions, and sends the third relative positions to the UE 1.

Operation 503: The second terminal sends the plurality of third relative positions to the first terminal.

In an example, after obtaining the first message, the second terminal may send the plurality of the third relative positions to the first terminal.

In another embodiment, to improve reliability of the third relative position sent by the second terminal and reduce a quantity of signaling interworking times, the second terminal may send a plurality of third relative positions to the first terminal when a first trigger condition is met.

The first trigger condition may be used to trigger the second terminal to send the plurality of the third relative positions to the first terminal. The first trigger condition may include a preset periodicity, a preset relative position threshold, and/or the like. This is not limited.

The preset periodicity may include a periodicity length and/or a preset quantity of sending times.

The periodicity length may be used to limit a time interval at which the second terminal sends the plurality of the third relative position to the first terminal. The second terminal may periodically send, to the first terminal based on the periodicity length, the third relative position obtained in the last measurement within the periodicity, or send, to the first terminal based on the periodicity length, an average value of the third relative positions obtained in a plurality of times of measurement within the periodicity, so that the first terminal may obtain a latest first relative position based on a latest third relative position and the second relative position. Therefore, a more accurate relative position between the first terminal and the second terminal is obtained.

The preset quantity of sending times may be a maximum quantity of times that the second terminal sends the plurality of the third relative positions to the first terminal. The second terminal may send, to the first terminal based on the preset quantity of sending times, the plurality of the third relative positions of the preset quantity of sending times. In this way, signaling increase and network resource waste caused by that the second terminal always periodically sends the plurality of the third relative positions to the first terminal can be avoided.

The preset relative position threshold may be configured based on a requirement. This is not limited. The preset relative position threshold may be a length threshold of a relative position. When a length of the relative position between the second terminal and the reference point is greater than the length threshold, it is considered that a distance between the second terminal and the reference point is relatively long, and precision of a third relative position corresponding to the second terminal cannot meet a precision requirement. When the length of the relative position between the second terminal and the reference point is less than the length threshold, it is considered that precision of the third relative position between the second terminal and the reference point meets the precision requirement, and the third relative position that meets the precision requirement is sent to the first terminal. In this embodiment of this application, the second terminal may filter the plurality of the third relative positions based on the preset relative position threshold, and send the third relative position whose length is less than the length threshold to the first terminal, to ensure precision of the relative position between the first terminal and the second terminal.

For example, as shown in FIG. 4, it is assumed that the first terminal is UE 1, the second terminal is UE 2, and the reference points may include UE 3, UE 4, UE 6, and UE 7. It is found, based on the length threshold of the preset relative position threshold, that a length of a third relative position between the UE 2 and the UE 7 is greater than the length threshold. In this case, the UE 2 does not send the third relative position between the UE 2 and the UE 7 to the UE 1. However, in a subsequent movement process of the UE 2 and the UE 7, the length of the third relative position between the UE 2 and the UE 7 gradually decreases to be less than or equal to the length threshold. It is considered that in this case, the third relative position between the UE 2 and the UE 7 meets the precision requirement. The UE 2 sends the third relative position between the UE 2 and the UE 7 to the UE 1, so that the UE 1 may determine, based on the third relative position between the UE 2 and the UE 7 and a second relative position between the UE 1 and the UE 7, a first relative position between the UE 1 and the UE 2.

For example, the first trigger condition may be configured by the first terminal or a server based on a requirement. This is not limited. An example is used in which the first trigger condition is configured by the first terminal. The first trigger condition may be sent to the second terminal included in the first message, and the second terminal may obtain the first trigger condition from the first message. Alternatively, the first trigger condition is included in another message sent by the first terminal to the second terminal. This is not limited.

In an embodiment, the first terminal may further preset a quantity threshold of third relative positions, and the quantity threshold may be carried in the first message. Before sending the plurality of third relative positions to the first terminal, the second terminal determines whether the quantity of third relative positions is greater than the quantity threshold. If the quantity of third relative positions is not greater than the quantity threshold, the second terminal sends the plurality of third relative positions to the first terminal. If the quantity of third relative positions is greater than the quantity threshold, the second terminal selects, from the plurality of third relative positions, a plurality of third relative positions whose quantity is the quantity threshold, and sends the selected plurality of third relative positions to the first terminal.

In another embodiment, there is a quantity threshold of third relative positions in the message sent by the second terminal to the first terminal. Before sending the plurality of third relative positions to the first terminal, the second terminal determines whether the quantity of third relative positions is greater than the quantity threshold. If the quantity of third relative positions is not greater than the quantity threshold, the second terminal sends the plurality of third relative positions to the first terminal. If the quantity of third relative positions is greater than the quantity threshold, the second terminal selects, from the plurality of third relative positions, a plurality of third relative positions whose quantity is the quantity threshold, and sends the selected plurality of third relative positions to the first terminal.

Operation 504: The first terminal processes the plurality of third relative positions and a plurality of second relative positions to obtain a plurality of first relative positions.

For any reference point, if the first terminal has obtained a second relative position between the first terminal and the reference point, or can obtain a second relative position between the first terminal and the reference point, for example, the first terminal may obtain an absolute position of the reference point from the reference point and obtain the relative position between the first terminal and the reference point based on an absolute position of the first terminal and the absolute position of the reference point, or the first terminal obtains the second relative position by directly measuring the reference point, the first terminal obtains the first relative position based on the second relative position and a third relative position corresponding to the reference point.

In an embodiment, the first terminal may process a second relative position and a third relative position that correspond to each reference point, to obtain a first relative position corresponding to each reference point. For details of the processing process, refer to formula 1. Details are not described again.

Operation 505: The first terminal processes the plurality of first relative positions to obtain a relative position between the first terminal and the second terminal.

Operation 505 is the same as operation 302, and details are not described again.

In operation 501, when sending the first message to the second terminal, the first terminal specifies a reference point, and includes identity information of the plurality of reference points in the first message, so that the second terminal sends, to the first terminal, only third relative positions corresponding to the plurality of reference points specified by the first terminal.

Alternatively, the first terminal may not specify a reference point, or when the first terminal cannot specify a reference point, the first terminal sends, to the second terminal, a message used to request to obtain all relative positions corresponding to the second terminal.

After receiving the message that is sent by the first terminal and that is used to request to obtain all the relative positions corresponding to the second terminal, the second terminal sends all the relative positions corresponding to the second terminal to the first terminal. The first terminal determines, based on all the relative positions sent by the second terminal and all the relative positions corresponding to the first terminal, whether there is a reference point. When determining that there are a plurality of reference points, the first terminal determines a relative position between each reference point and the first terminal as a second relative position, determines a relative position between each reference point and the second terminal as a third relative position, and determines a first relative position corresponding to each reference point based on the second relative position and the third relative position corresponding to each reference point, that is, obtains a plurality of first relative positions.

In an embodiment, the first terminal may further preset a quantity threshold of third relative positions, and the quantity threshold may be carried in the first message. Before sending the plurality of third relative positions to the first terminal, the second terminal determines whether the quantity of the plurality of third relative positions is greater than the quantity threshold. If the quantity of the plurality of third relative positions is not greater than the quantity threshold, the second terminal sends the plurality of third relative positions to the first terminal. If the quantity of the plurality of third relative positions is greater than the quantity threshold, the second terminal selects, from the plurality of third relative positions, a plurality of third relative positions whose quantity is the quantity threshold, and sends the plurality of third relative positions to the first terminal. Alternatively, a message sent by the second terminal to the first terminal includes a quantity threshold of third relative positions. Before sending the plurality of the third relative positions to the first terminal, the second terminal determines whether a quantity of the plurality of the third relative positions is greater than the quantity threshold. If the quantity is not greater than the quantity threshold, the second terminal sends the plurality of third relative positions to the first terminal. If the quantity is greater than the quantity threshold, the second terminal selects, from the plurality of the third relative positions, a plurality of third relative positions whose quantity is the quantity threshold, and sends the plurality of third relative positions to the first terminal.

FIG. 4 is used as an example. The first terminal is UE 1, and the second terminal is UE 2. The UE 1 sends, to the UE 2, a message used to request to obtain all relative positions corresponding to the second terminal. The UE 2 sends, to the UE 1 based on the message, relative positions respectively between the UE 2 and UE 3, UE 4, UE 6, UE 7, UE 9, UE 10, and UE 11. The UE 1 determines, based on all the received relative positions corresponding to the UE 2 and all the received relative positions corresponding to the UE 1, that the UE 3, the UE 4, the UE 6, and the UE 7 are reference points, determines a relative position between the UE 1 and the UE 3, a relative position between the UE 1 and the UE 4, a relative position between the UE 1 and the UE 6, and a relative position between the UE 1 and the UE 7 as the second relative positions, and determines a relative position between the UE 2 and the UE 3, a relative position between the UE 2 and the UE 4, a relative position between the UE 2 and the UE 6, and a relative position between the UE 2 and the UE 7 as the third relative positions. The UE 1 processes the plurality of second relative positions and the plurality of third relative positions to obtain the plurality of first relative positions. For the processing process, refer to formula 1. Details are not described again. The UE 1 processes the plurality of first relative positions to obtain the relative position between the first terminal and the second terminal. The processing process is based on operation 302, and details are not described again.

In an embodiment, when the first terminal does not specify a reference point, the first terminal may find, based on all the relative positions received from the second terminal, another terminal in communication connection with the second terminal. FIG. 4 is used as an example. When the UE 1 sends, to the UE 2, a message used to request to obtain all the relative positions corresponding to the second terminal, the UE 2 sends, to the UE 1, all the relative positions corresponding to the UE 2. The UE 1 may find existence of the UE 9, the UE 10, and the UE 11 based on the relative position between the UE 2 and the UE 9, the relative position between the UE 2 and the UE 10, and the relative position between the UE 2 and the UE 11, and determine that the UE 9, the UE 10, and the UE 11 are in communication connection with the UE 2 through a PC5 interface. Therefore, based on the method, another terminal that is not in communication connection with the current terminal may be found, to establish a complete panorama of a surrounding terminal.

Figure 6:
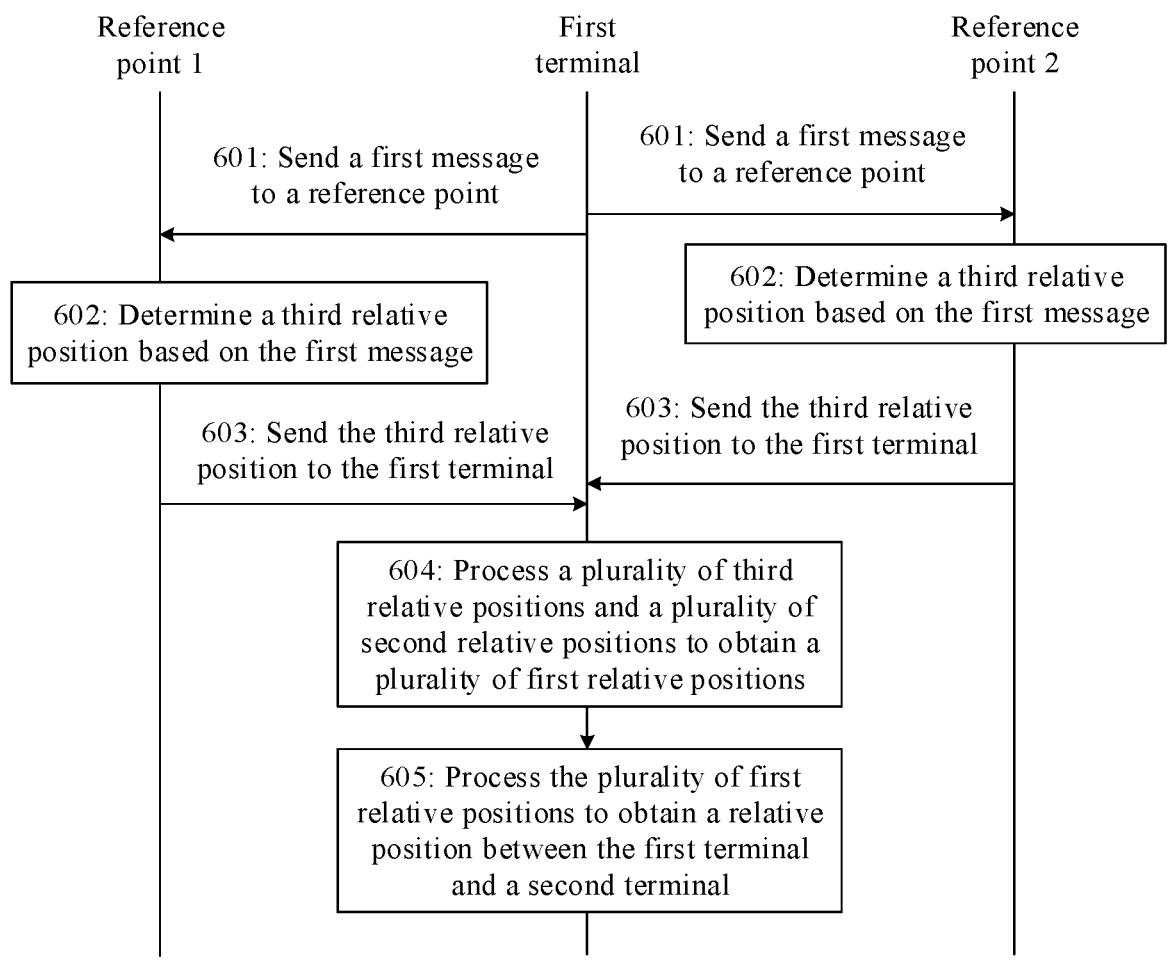
FIG. 6 is a schematic diagram of a relative positioning method according to an embodiment of the present application.

For a process in which the first terminal obtains the third relative positions from the plurality of reference points and determines the plurality of first relative positions based on the plurality of third relative positions and the plurality of second relative positions in operation 301, refer to FIG. 6. FIG. 6 shows a relative positioning method according to an embodiment of this application. In FIG. 6, a reference point 1 and a reference point 2 are used as examples for detailed description. As shown in FIG. 6, the relative positioning method may include the following operations.

Operation 601: A first terminal sends a first message to each of a plurality of reference points.

The first message is used to request to obtain a third relative position between a second terminal and a reference point.

In an embodiment, the first message may include identity information of the second terminal, and the identity information of the second terminal may be used to indicate the second terminal. For example, the identity information of the second terminal may be an identifier (ID) of the second terminal, an IP address of the second terminal, or another identifier used to identify the second terminal. This is not limited.

The first message may be any one of the following messages: a PC5 signaling message, an RRC message, PHY layer control signaling, PDCP layer control signaling, or MAC layer control signaling.

For example, the first terminal may communicate with the second terminal in advance through a PC5 interface, to request the second terminal to report identity information of all terminals that are in communication connection with the second terminal through the PC5 interface. The first terminal determines, based on the identity information reported by the second terminal and the identity information of all the terminals that are in communication connection with the first terminal through the PC5 interface, a plurality of reference points that are in communication connection with both the first terminal and the second terminal through the PC5 interface. In addition, the first terminal sends the first message to each of the plurality of reference points. Alternatively, the reference point is a terminal through which a relative position between the first terminal and a current terminal has been obtained by the first terminal. Alternatively, the reference point is a terminal through which a relative position between the first terminal relative and a current terminal can be obtained by the first terminal by using another relative positioning method.

Specifically, FIG. 4 is used as an example. The first terminal is UE 1, the second terminal is UE 2, and the plurality of reference points include UE 3, UE 4, UE 6, and UE 7. The UE 1 may separately send the first message to the UE 3, the UE 4, the UE 6, and the UE 7. The first message may include the identity information of the second terminal.

Operation 602: Each reference point receives the first message, and determines a third relative position.

In an embodiment, determining the third relative position based on the identity information of the second terminal included in the first message may be performed as follows.

After receiving the first message, the reference point identifies the second terminal based on the identity information of the second terminal that is included in the first message. For any reference point, if the reference point has obtained a relative position between the reference point and the second terminal, or can obtain a relative position between the second terminal and the reference point by using another relative positioning method, the reference point determines that the relative position between the second terminal and the reference point is a third relative position, in other words, needs to send the relative position between the second terminal and the reference point to the first terminal in operation 603.

FIG. 4 is used as an example. After receiving the first message sent by the UE 1, the UE 3 identifies the UE 2 based on the first message, determines a relative position between the UE 2 and the UE 3, and sends the relative position to the first terminal. After receiving the first message sent by the UE 1, the UE 4 identifies the UE 2 based on the first message, determines a relative position between the UE 2 and the UE 4, and sends the relative position to the first terminal. After receiving the first message sent by the UE 1, the UE 6 identifies the UE 2 based on the first message, determines a relative position between the UE 2 and the UE 6, and sends the relative position to the first terminal. After receiving the first message sent by the UE 1, the UE 7 identifies the UE 2 based on the first message, determines a relative position between the UE 2 and the UE 7, and sends the relative position to the first terminal.

Operation 603: Each reference point sends the third relative position to the first terminal.

In an example, after obtaining the first message, the reference point may send the third relative position to the first terminal.

In another example, to improve reliability of the third relative position sent by the reference point and reduce a quantity of signaling interworking times, the reference point may send the third relative position to the first terminal when a first trigger condition is met.

The first trigger condition may be used to trigger the reference point to send the third relative position to the first terminal. The first trigger condition may include a preset periodicity, a preset relative position threshold, and/or the like. For specific application of the first trigger condition, refer to the descriptions in operation 503. Details are not described again.

Operation 604: The first terminal processes the plurality of third relative positions and a plurality of second relative positions to obtain a plurality of first relative positions.

Operation 604 is the same as operation 504, and details are not described again.

Operation 605: The first terminal processes the plurality of first relative positions to obtain a relative position between the first terminal and the second terminal.

Operation 605 is the same as operation 302, and details are not described again.

In operation 601, the first terminal specifies a reference point, and the first terminal obtains the third relative position by sending the first message to the specified reference point.

Alternatively, the first terminal may not specify the reference point. When the first terminal does not specify the reference point, the first terminal sends, to all terminals in communication connection with the first terminal through the PC5 interface, a message used to request to obtain the relative position between the first terminal and the second terminal. The message includes the identity information of the second terminal.

When a terminal is in communication connection with the first terminal through the PC5 interface receives a message that is sent by the first terminal and used to request to obtain the relative position between the terminal and the second terminal, the terminal determines whether the terminal is in communication connection with the second terminal through the PC5 interface. If the terminal is in communication connection with the second terminal through the PC5 interface, the terminal determines the relative position between the terminal and the second terminal as the third relative position, and sends the third relative position to the first terminal.

FIG. 4 is used as an example. The first terminal is UE 1, and the second terminal is UE 2. The UE 1 separately sends, to the UE 3, the UE 4, the UE 5, the UE 6, the UE 7, and the UE 8, a message that includes identity information of the UE 2 and that is used to request to obtain a position relative to the UE 2. The UE 3, the UE 4, the UE 6, and the UE 7 respectively find that the UE 3, the UE 4, the UE 6, and the UE 7 are in communication connection with the UE 2 through the PC5 interface. The UE 3 determines a relative position between the UE 2 and the UE 3, and sends the relative position to the UE 1. The UE 4 determines a relative position between the UE 2 and the UE 4, and sends the relative position to the UE 1. The UE 6 determines a relative position between the UE 2 and the UE 6, and sends the relative position to the UE 1. The UE 7 determines a relative position between the UE 2 and the UE 7, and sends the relative position to the UE 1. The UE 1 receives the plurality of third relative positions, and processes the plurality of second relative positions and the plurality of third relative positions to obtain the plurality of first relative positions. For the processing process, refer to formula 1. Details are not described again. The UE 1 processes the plurality of first relative positions to obtain the relative position between the first terminal and the second terminal. The processing process is based on operation 302, and details are not described again.

Alternatively, the first terminal may not specify the second terminal. When the first terminal does not specify the second terminal, the first terminal sends, to all terminals in communication connection with the first terminal through the PC5 interface, a message used to request to obtain all relative positions corresponding to a terminal in communication connection with the first terminal through the PC5 interface.

After receiving the message used to request to obtain all the relative positions corresponding to the terminal in communication connection with the first terminal through the PC5 interface, the terminal in communication connection with the first terminal through the PC5 interface sends all the relative positions corresponding to the terminal to the first terminal. After receiving all relative positions sent by other terminals, the first terminal determines whether one of the terminals corresponding to all the relative positions is the second terminal, and if yes, determines the relative position as the third relative position.

FIG. 4 is used as an example. The first terminal is UE 1, and the second terminal is UE 2. The UE 1 separately sends, to the UE 3, the UE 4, the UE 5, the UE 6, the UE 7, and the UE 8, a message used to request to obtain all relative positions corresponding to terminals in communication connection with the UE 1 through the PC5 interface. After receiving the message, the UE 3, the UE 4, the UE 5, the UE 6, the UE 7, and the UE 8 separately send, to the UE 1, all relative positions corresponding to the UE 3, the UE 4, the UE 5, the UE 6, the UE 7, and the UE 8. For example, the UE 3 sends a relative position between the UE 3 and the UE 2, a relative position between the UE 3 and the UE 4, a relative position between the UE 3 and the UE 5, and a relative position between the UE 3 and the UE 9 to the UE 1. After the UE 1 receives the relative positions sent by the UE 3, the UE 1 determines the relative position between the UE 3 and the UE 2 as the third relative position. Similarly, the UE 1 determines a relative position between the UE 4 and the UE 2, a relative position between the UE 6 and the UE 2, and a relative position between the UE 7 and the UE 2 as the third relative positions. The UE 1 processes the plurality of second relative positions and the plurality of third relative positions to obtain the plurality of first relative positions. For the processing process, refer to formula 1. Details are not described again. The UE 1 processes the plurality of first relative positions to obtain the relative position between the first terminal and the second terminal. The processing process is based on operation 302, and details are not described again.

In the foregoing method, when the first terminal does not specify the reference point or does not specify the second terminal, the first terminal may find, based on the received relative position, another terminal that is not in communication connection with the first terminal through the PC5 interface. FIG. 4 is used as an example. When the UE 1 does not specify the reference point or the first message is used to request to obtain all relative positions corresponding to the terminal, the UE 1 may find the UE 9 based on a relative position sent by the UE 5, and find the UE 11 based on a relative position sent by the UE 7. Therefore, based on the method, the terminal may also find another terminal that is not in communication connection with the terminal through the PC5 interface, to establish a complete panorama of a surrounding terminal.

Figure 7:
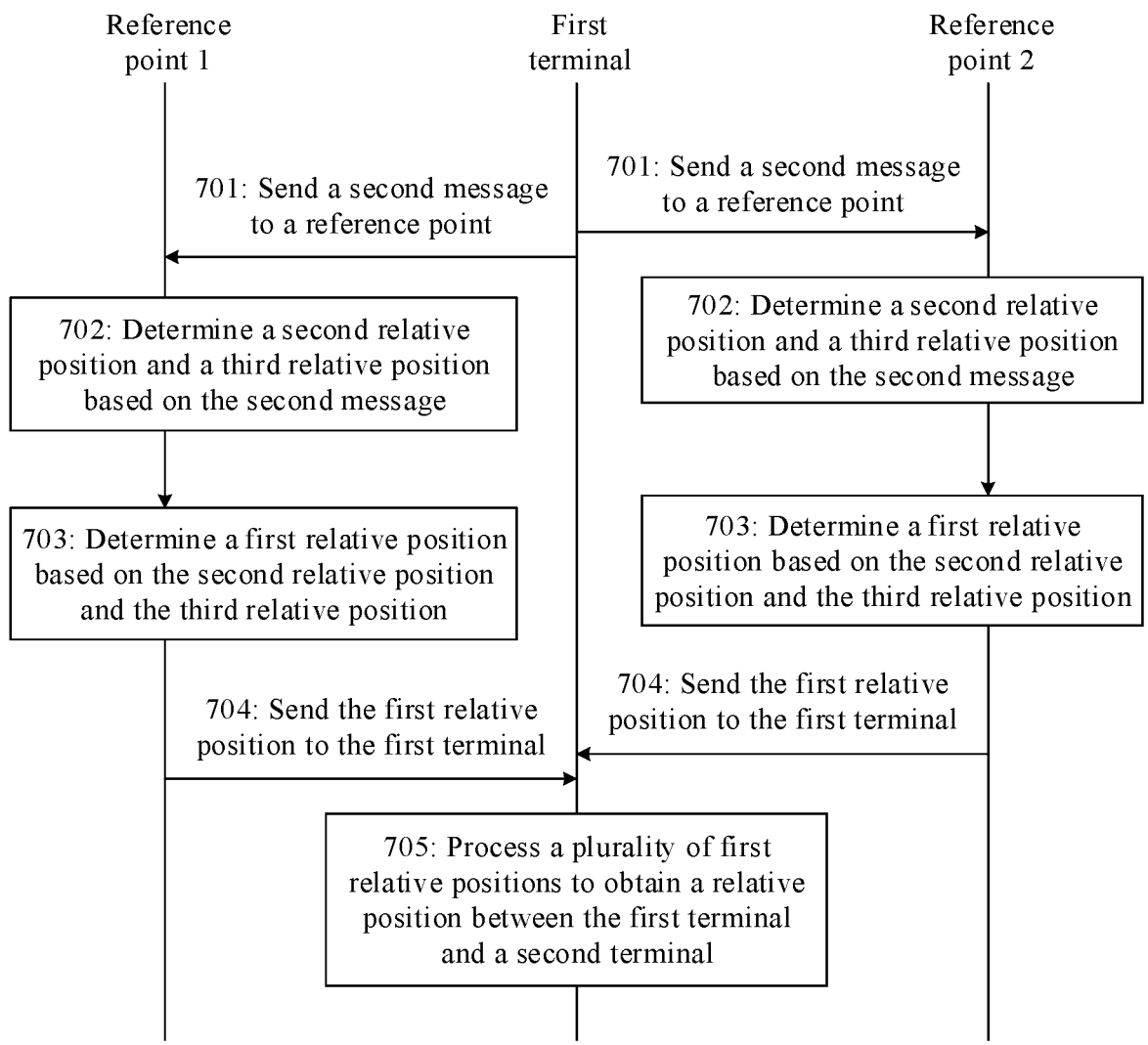
FIG. 7 is a schematic diagram of a relative positioning method according to an embodiment of the present application.

For a process in which the first terminal obtains the first relative positions from the plurality of reference points in operation 301, refer to FIG. 7. FIG. 7 shows a relative positioning method based on an embodiment of this application. In FIG. 7, a reference point 1 and a reference point 2 are used as examples for detailed description. As shown in FIG. 7, the relative positioning method may include the following operations.

Operation 701: A first terminal sends a second message to each of a plurality of reference points.

The second message is used to request to obtain a first relative position between the first terminal and a second terminal.

In an embodiment, the second message may include identity information of the second terminal. For the identity information of the second terminal, refer to operation 601. Details are not described again.

The second message may be any one of the following messages: an RRC message, PHY layer control signaling, PDCP layer control signaling, or MAC layer control signaling.

For a process in which the first terminal determines the plurality of reference points, refer to operation 601. Details are not described again.

Operation 702: Each reference point receives the second message, and determines a third relative position.

In an embodiment, a plurality of third relative positions are determined based on the identity information of the second terminal included in the second message. Operation 702 is the same as operation 602, and details are not described again.

Operation 703: Each reference point determines a first relative position based on a second relative position and the third relative position.

For details of the processing process, refer to formula 1. Details are not described again.

Operation 704: Each reference point sends the first relative position to the first terminal.

In an example, after obtaining the second message, each reference point sends the first relative position to the first terminal.

In another example, to improve reliability of the first relative position sent by the reference point and reduce a quantity of signaling interworking times, the reference point may send the first relative position to the first terminal when a second trigger condition is met.

The second trigger condition may be used to trigger the reference point to send the first relative position to the first terminal. The second trigger condition may include a preset periodicity, a preset relative position threshold, and/or the like.

Specific application of the second trigger condition is similar to specific application of the first trigger condition in the foregoing operation 503, and details are not described again.

Operation 705: The first terminal processes the plurality of first relative positions to obtain a relative position between the first terminal and the second terminal.

Operation 705 is the same as operation 302, and details are not described again.

In the foregoing method, the reference point calculates the second relative position and the third relative position that are corresponding to the reference point, to obtain the first relative position. The first terminal needs to calculate only the received first relative position, thereby reducing calculation load and CPU overheads of the first terminal.

Figure 8:
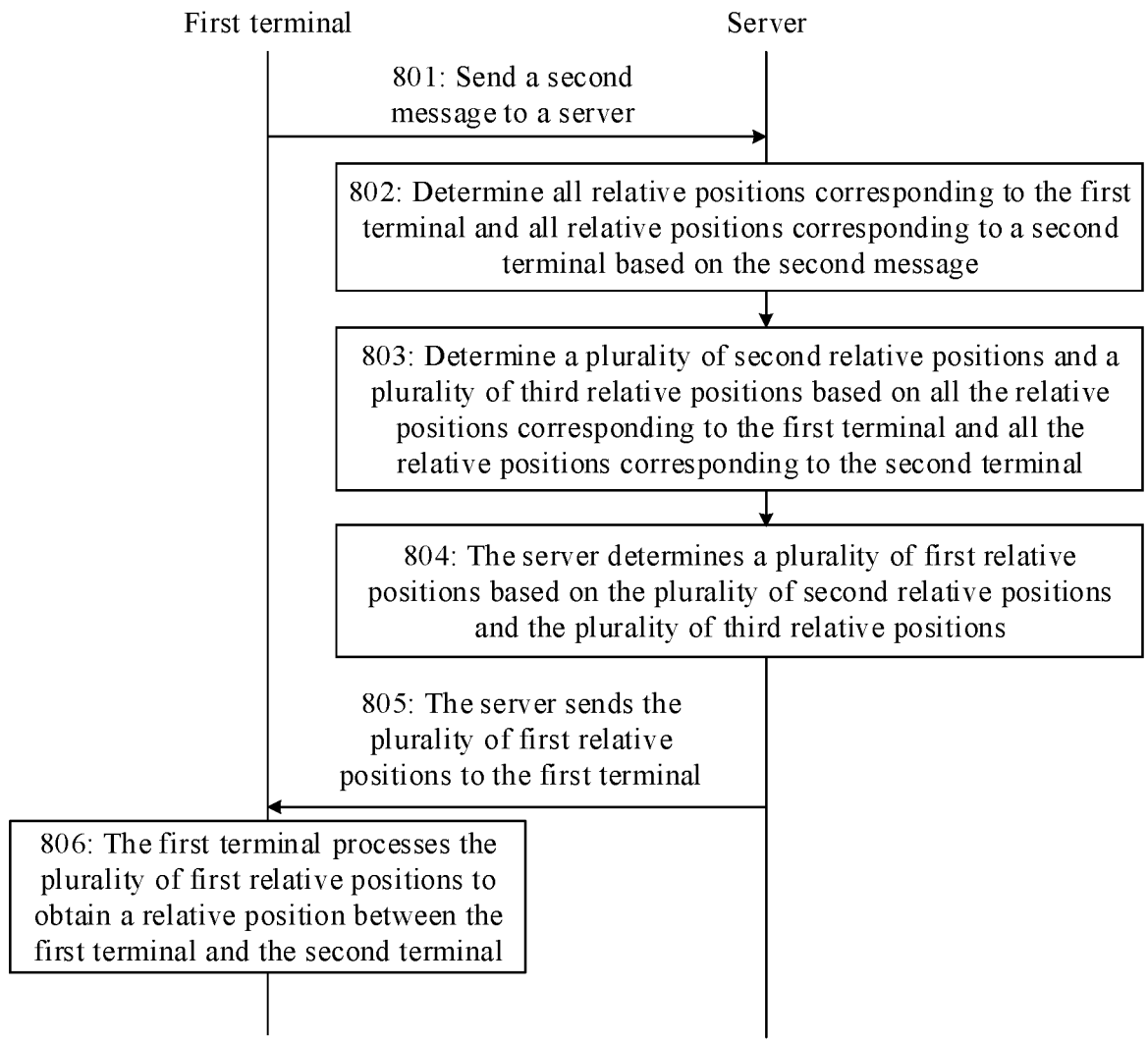
FIG. 8 is a schematic diagram of a relative positioning method according to an embodiment of the present application.

For a process in which the first terminal obtains the first relative positions from a server in operation 301, refer to FIG. 8. FIG. 8 is a schematic diagram of a relative positioning method according to an embodiment of the application. As shown in FIG. 8, the relative positioning method may include the following operations.

Operation 801: A first terminal sends a second message to a server.

Specific content of the second message is the same as that of the second message in operation 701. Details are not described again.

Operation 802: The server receives the second message, and determines, based on identity information of a second terminal included in the second message, all relative positions corresponding to the first terminal and all relative positions corresponding to the second terminal.

In an embodiment, the server may identify the second terminal based on the identity information of the second terminal included in the second message, and determine all the relative positions corresponding to the second terminal.

FIG. 4 is used as an example. The first terminal is UE 1, and the second terminal is UE 2. After receiving the second message sent by the UE 1, the server identifies the UE 2, and determines a relative position between the UE 2 and UE 3, a relative position between the UE 2 and UE 4, a relative position between the UE 2 and UE 6, a relative position between the UE 2 and UE 7, a relative position between the UE 2 and UE 10, and a relative position between the UE 2 and UE 11.

The server determines, based on the UE 1, a relative position between the UE 1 and the UE 3, a relative position between the UE 1 and the UE 4, a relative position between the UE 1 and the UE 5, a relative position between the UE 1 and the UE 6, a relative position between the UE 1 and the UE 7, and a relative position between the UE 1 and the UE 8.

Operation 803: The server determines a plurality of second relative positions and a plurality of third relative positions based on all the relative positions corresponding to the first terminal and all the relative positions corresponding to the second terminal.

In an embodiment, the server may determine a plurality of reference points based on all the relative positions corresponding to the first terminal and all the relative positions corresponding to the second terminal, determine relative positions between the reference points and the first terminal as a plurality of second relative positions, and determine relative positions between the reference points and the second terminal as a plurality of third relative positions.

FIG. 4 is used as an example. The first terminal is the UE 1, and the second terminal is the UE 2, the server determines, based on the relative position between the UE 1 and the UE 3, the relative position between the UE 1 and the UE 4, the relative position between the UE 1 and the UE 5, the relative position between the UE 1 and the UE 6, the relative position between the UE 1 and the UE 7, and the relative position between the UE 1 and the UE 8 that are corresponding to the UE 1, and the relative position between the UE 2 and the UE 3, the relative position between the UE 2 and the UE 4, the relative position between the UE 2 and the UE 6, the relative position between the UE 2 and the UE 7, the relative position between the UE 2 and the UE 10, and the relative position between the UE 2 and the UE 11 that are corresponding to the UE 2, that reference points may include the UE 3, the UE 4, the UE 6, and the UE 7, determines that the relative position between the UE 1 and the UE 3, the relative position between the UE 1 and the UE 4, the relative position between the UE 1 and the UE 6, and the relative position between the UE 1 and the UE 7 are second relative positions, and determines that the relative position between the UE 2 and the UE 3, the relative position between the UE 2 and the UE 4, the relative position between the UE 2 and the UE 6, and the relative position between the UE 2 and the UE 7 are the third relative positions.

Operation 804: The server determines a plurality of first relative positions based on the plurality of second relative positions and the plurality of third relative positions.

For the processing process, refer to formula 1. Details are not described again.

Operation 805: The server sends the plurality of first relative positions to the first terminal.

In an example, after obtaining the second message, the server may send the plurality of first relative positions to the first terminal.

In another example, to improve reliability of the first relative position sent by the server and reduce a quantity of signaling interworking times, the server may send the plurality of first relative positions to the first terminal when the second trigger condition is met.

The second trigger condition may be used to trigger the server to send the plurality of first relative positions to the first terminal. The second trigger condition includes a preset periodicity, a preset relative position threshold, and/or the like.

Specific application of the second trigger condition is similar to specific application of the first trigger condition in the foregoing operation 503, and details are not described again.

In an embodiment, the first terminal may further preset a quantity threshold of first relative positions that can be received by the first terminal. The quantity threshold may be carried in the foregoing second message. Before sending the plurality of first relative positions to the first terminal, the server determines whether the quantity of the plurality of first relative positions is greater than the quantity threshold. If the quantity of the plurality of first relative positions is not greater than the quantity threshold, the server sends the plurality of first relative positions to the first terminal. If the quantity of the plurality of first relative positions is greater than the quantity threshold, the server selects, from the plurality of first relative positions, a plurality of first relative positions whose quantity is the quantity threshold, and sends the selected plurality of first relative positions to the first terminal.

In an embodiment, there is a quantity threshold of first relative positions that can be sent by the server in the message sent by the server to the first terminal. Before sending the plurality of first relative positions to the first terminal, the server determines whether the quantity of the plurality of first relative positions is greater than the quantity threshold. If the quantity is not greater than the quantity threshold, the server sends the plurality of the first relative positions to the first terminal, and if the quantity is greater than the quantity threshold, the server selects, from the plurality of first relative positions, a plurality of first relative positions whose quantity is the quantity threshold, and sends the selected plurality of first relative positions to the first terminal.

In an embodiment, the server may further process the plurality of first relative positions to obtain a relative position between the first terminal and the second terminal, and then send the relative position between the first terminal and the second terminal to the first terminal. In this case, operation 806 is ignored.

Operation 806: The first terminal processes the plurality of first relative positions to obtain a relative position between the first terminal and the second terminal.

Operation 806 is the same as operation 302, and details are not described again.

In the foregoing method, the server may process the plurality of second relative positions and the plurality of third relative positions to obtain the plurality of first relative positions, and send the plurality of first relative positions to the first terminal, to reduce calculation load and CPU overheads of the first terminal. Alternatively, the server may directly send the plurality of second relative positions and the plurality of third relative positions to the first terminal (that is, replace operation 805). The first terminal processes the plurality of second relative positions and the plurality of third relative positions to obtain the plurality of first relative positions, and then performs operation 806.

It should be noted that, in FIG. 8, the server may alternatively be a base station (that is, a function of the server is implemented on the base station), and replacing the server in FIG. 8 with the base station also falls within the protection scope of the present application.

The foregoing mainly describes the solutions provided in embodiments of this application from a perspective of interaction between network elements. It may be understood that, to implement the foregoing functions, the terminal includes corresponding hardware structures and/or software modules for performing the functions. A person skilled in the art should be easily aware that the algorithm operations in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

For example, functional modules may be planned in correspondence to functions, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

Figure 9:
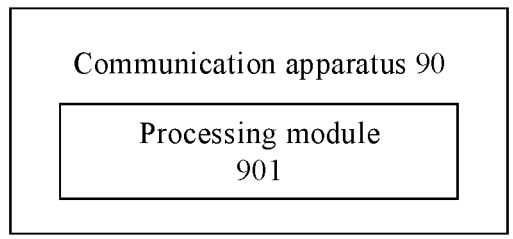
FIG. 9 is a schematic composition diagram of a communication apparatus according to an embodiment of this application.

In a case in which each function module is divided based on each function, FIG. 9 is a structural diagram of a communication apparatus 90. The communication apparatus 90 may be a first terminal, a chip in the first terminal, or a system-on-a-chip. The communication apparatus 90 may be configured to perform a function of the first terminal in the foregoing embodiments. The communication apparatus 90 shown in FIG. 9 includes a processing module 901.

The processing module 901 is configured to obtain a plurality of first relative positions. Each of the plurality of first relative positions is determined based on a second relative position and a third relative position. The first relative position is an initial relative position between a first terminal and a second terminal. The second relative position is a relative position between the first terminal and a reference point. The third relative position is a relative position between the second terminal and the reference point. For example, the processing module 901 may be configured to support the communication apparatus 90 in performing operation 301.

The processing module 901 is further configured to process the plurality of first relative positions, to obtain a relative position between the first terminal and the second terminal. For example, the processing module 901 may be configured to support the communication apparatus 90 in performing operation 302, operation 505, operation 605, operation 705, or operation 806.

For a specific implementation of the communication apparatus 90, refer to behavior functions of the first terminal in the relative positioning method in FIG. 3, FIG. 5, FIG. 6, FIG. 7, or FIG. 8.

In an embodiment, the communication apparatus 90 further includes a sending module 902. The sending module 902 is configured to send a first message used to request to obtain a plurality of third relative positions to the second terminal. The processing module 901 is further configured to: receive the plurality of third relative positions from the second terminal, and process the plurality of third relative positions and a plurality of second relative positions to obtain the plurality of first relative positions.

The sending module 902 is configured to send a first message used to request to obtain a plurality of third relative positions to a plurality of reference points. The processing module 901 is further configured to: receive the plurality of third relative positions from the plurality of reference points, and process the plurality of third relative positions and a plurality of second relative positions to obtain the plurality of first relative positions.

In an embodiment, the sending module 902 is configured to: when sending the first message to the second terminal, the first message may include identity information of the plurality of reference points. Alternatively, when sending the first message to the plurality of reference points, the first message may include identity information of the second terminal.

In an embodiment, the sending module 902, when sending the first message to the second terminal, the first message may further include a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times. Alternatively, when sending the first message to the plurality of reference points, the first message may further include a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In an embodiment, the sending module 902 is further configured to send, to the plurality of reference points, a second message used to request to obtain the plurality of first relative positions. The obtaining module 901 is further configured to receive the plurality of first relative positions from the plurality of reference points. Alternatively, the sending module 902 is further configured to send, to a server, a second message used to request to obtain the plurality of first relative positions. The obtaining module 901 is further configured to receive the plurality of first relative positions from the server.

In an embodiment, the second message may include the identity information of the second terminal.

In an embodiment, the sending module 902 is configured to: when sending the second message to the plurality of reference points, the second message may further include a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times; or configured to: when sending the second message to the server, the second message may further include a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In an embodiment, the sending module 901 is configured to: perform weighting processing on the plurality of first relative positions to obtain the relative position between the first terminal and the second terminal, or process the plurality of first relative positions by using a preset probability distribution model, to obtain the relative position between the first terminal and the second terminal.

In an embodiment, the relative position includes a length and an angle. The length is a length of a line segment between two terminals corresponding to the relative position, and the angle is an included angle formed between a straight line on which the two terminals are located and a normal line along an angle direction, where the normal line is a straight line in a preset direction, and the angle direction is a clockwise direction or a counterclockwise direction.

In another embodiment, the processing module 901 in FIG. 9 may be replaced with a processor, and a function of the processing module 901 may be integrated into the processor. In an embodiment, the communication apparatus 90 shown in FIG. 9 may further include a memory. When the processing module 901 is replaced with a processor, the communication apparatus 90 in this embodiment of this application may be the communication apparatus shown in FIG. 2.

Figure 10:
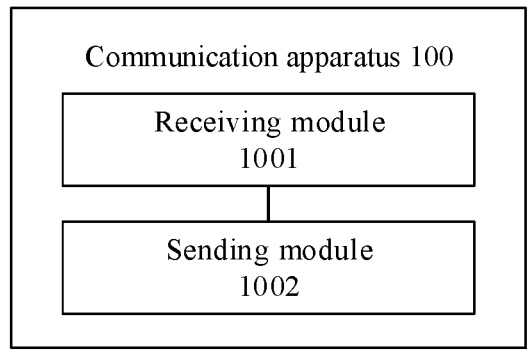
FIG. 10 is a schematic composition diagram of a communication apparatus according to an embodiment of this application.

FIG. 10 is a structural diagram of a communication apparatus 100. The communication apparatus 100 may be a second terminal, a chip in the second terminal, or a system-on-a-chip. The communication apparatus 100 may be configured to perform a function of the second terminal in the foregoing embodiments. The communication apparatus 100 shown in FIG. 10 includes a receiving module 1001 and a sending module 1002.

The receiving module 1001 is configured to receive a first message from a first terminal. The first message is used to request to obtain a plurality of third relative positions. The third relative position is a relative position between the second terminal and a reference point.

The sending module 1002 is configured to send the plurality of third relative positions to the first terminal.

For a specific implementation of the communication apparatus 100, refer to behavior functions of the second terminal in the relative positioning method in FIG. 5.

In an embodiment, the first message may include identity information of a plurality of reference points and/or a first trigger condition used to trigger the second terminal to send the plurality of third relative positions to the first terminal. The first trigger condition includes a preset periodicity and/or a preset relative position threshold, and the preset periodicity includes a periodicity length and/or a preset quantity of sending times.

In another embodiment, the receiving module 1001 and the sending module 1002 in FIG. 10 may be replaced with a transceiver, and functions of the receiving module 1001 and the sending module 1002 may be integrated into the transceiver. In an embodiment, the communication apparatus 100 shown in FIG. 10 may further include a processor and a memory. When the receiving module 1001 and the sending module 1002 are replaced with a transceiver, the communication apparatus 100 in this embodiment of this application may be the communication apparatus shown in FIG. 2.

Figure 11:
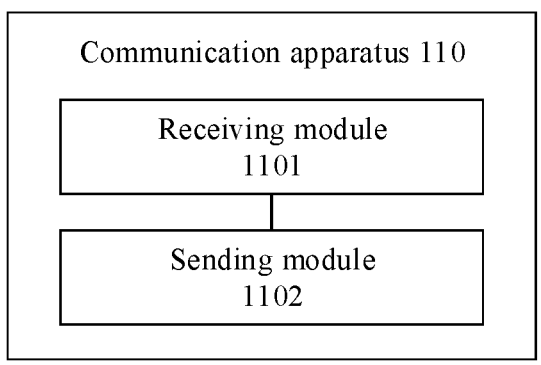
FIG. 11 is a schematic composition diagram of a communication apparatus according to an embodiment of the present application.

FIG. 11 is a structural diagram of a communication apparatus 110. The communication apparatus 110 may be a plurality of reference points, or a chip in a plurality of reference points, or a system-on-a-chip. The communication apparatus 110 may be configured to perform a function of the plurality of reference points in the foregoing embodiments. The communication apparatus 110 shown in FIG. 11 includes a receiving module 1101 and a sending module 1102.

The receiving module 1101 is configured to receive a first message from a first terminal. The first message is used to request to obtain a plurality of third relative positions. The third relative position is a relative position between the second terminal and a reference point.

The sending module 1102 is configured to send the plurality of third relative positions to the first terminal.

For a specific implementation of the communication apparatus 110, refer to behavior functions of the plurality of reference points in the relative positioning method in FIG. 6.

In an embodiment, the first message may include identity information of the second terminal and/or a first trigger condition used to trigger the plurality of reference points to send the plurality of third relative positions to the first terminal. The first trigger condition includes a preset periodicity and/or a preset relative position threshold, and the preset periodicity includes a periodicity length and/or a preset quantity of sending times.

In another embodiment, the receiving module 1101 and the sending module 1102 in FIG. 11 may be replaced with a transceiver, and functions of the receiving module 1101 and the sending module 1102 may be integrated into the transceiver. In an embodiment, the communication apparatus 110 shown in FIG. 11 may further include a processor and a memory. When the receiving module 1101 and the sending module 1102 are replaced with a transceiver, the communication apparatus 110 in this embodiment of this application may be the communication apparatus shown in FIG. 2.

Figure 12:
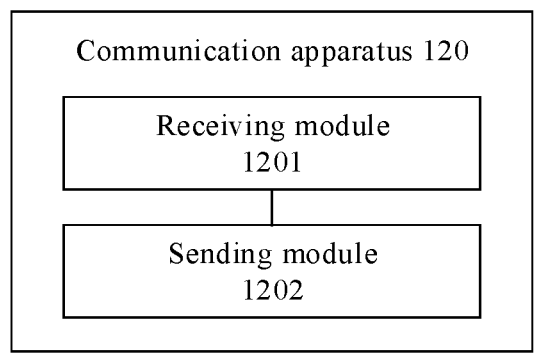
FIG. 12 is a schematic composition diagram of a communication apparatus according to an embodiment of the present application.

FIG. 12 is a structural diagram of a communication apparatus 120. The communication apparatus 120 may be a plurality of reference points, or a chip in a plurality of reference points, or a system-on-a-chip. The communication apparatus 120 may be configured to perform a function of the plurality of reference points in the foregoing embodiments. In a possible implementation, the communication apparatus 120 shown in FIG. 12 includes a receiving module 1201 and a sending module 1202.

The receiving module 1201 is configured to receive a second message from a first terminal. The second message is used to request to obtain a plurality of first relative positions. The first relative position is an initial relative position between a first terminal and a second terminal.

The sending module 1202 is configured to send the plurality of first relative positions to the first terminal.

For a specific implementation of the communication apparatus 120, refer to behavior functions of the communication apparatus in the relative positioning method in FIG. 7.

In an embodiment, the second message may include identity information of the second terminal and/or a second trigger condition used to trigger the plurality of reference points to send the plurality of first relative positions to the first terminal. The second trigger condition includes a preset periodicity and/or a preset relative position threshold, and the preset periodicity includes a periodicity length and/or a preset quantity of sending times.

In another embodiment, the receiving module 1201 and the sending module 1202 in FIG. 12 may be replaced with a transceiver, and functions of the receiving module 1201 and the sending module 1202 may be integrated into the transceiver. In an embodiment, the communication apparatus 120 shown in FIG. 12 may further include a processor and a memory. When the receiving module 1201 and the sending module 1202 are replaced with a transceiver, the communication apparatus 120 in this embodiment of this application may be the communication apparatus shown in FIG. 2.

Figure 13:
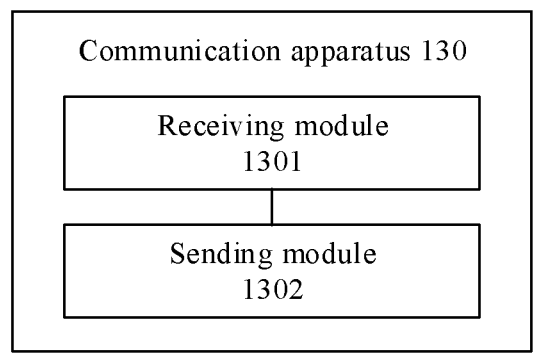
FIG. 13 is a schematic composition diagram of a communication apparatus according to an embodiment of the present application.

FIG. 13 is a structural diagram of a communication apparatus 130. The communication apparatus 130 may be a server, a chip in a server, or a system-on-a-chip. The communication apparatus 130 may be configured to perform a function of the server in the foregoing embodiments. In a possible implementation, the communication apparatus 130 shown in FIG. 13 includes a receiving module 1301 and a sending module 1302.

The receiving module 1301 is configured to receive a second message from a first terminal. The second message is used to request to obtain a plurality of first relative positions. The first relative position is an initial relative position between a first terminal and a second terminal.

The sending module 1302 is configured to send the plurality of first relative positions to the first terminal.

For a specific implementation of the communication apparatus 130, refer to behavior functions of the communication apparatus in the relative positioning method in FIG. 8.

In an embodiment, the second message may include identity information of the second terminal and/or a second trigger condition used to trigger the server to send the plurality of first relative positions to the first terminal. The second trigger condition includes a preset periodicity and/or a preset relative position threshold, and the preset periodicity includes a periodicity length and/or a preset quantity of sending times.

In another embodiment, the receiving module 1301 and the sending module 1302 in FIG. 13 may be replaced with a transceiver, and functions of the receiving module 1301 and the sending module 1302 may be integrated into the transceiver. In an embodiment, the communication apparatus 130 shown in FIG. 13 may further include a processor and a memory. When the receiving module 1301 and the sending module 1302 are replaced with a transceiver, the communication apparatus 130 in this embodiment of this application may be the communication apparatus shown in FIG. 2.

An embodiment of this application further provides a computer-readable storage medium. All or some of the processes in the foregoing method embodiments may be completed by a computer program instructing related hardware. The program may be stored in the foregoing computer-readable storage medium. When the program is executed, the processes of the foregoing method embodiments may be performed. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may alternatively include both the internal storage unit of the terminal and the external storage device. The computer-readable storage medium is configured to store the computer program and other programs and data that are required by the terminal. The computer-readable storage medium may be further configured to temporarily store data that has been output or is to be output.

It should be noted that, in the specification, claims, and accompanying drawings of this application, terms "first", "second", and the like are intended to distinguish between different objects but do not indicate a particular order. In addition, the terms "including", "having", and any other variant thereof are intended to cover non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

It should be understood that in this application, "at least one (item)" means one or more, "a plurality of" means two or more, and "at least two (items)" means two, three, or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or similar expressions indicate any combination of the following, including any combination of singular items (pieces) or plural items (pieces). For example, at least one of a, b, or c may represent a, b, c, "a and b", "a and c", "b and c", or "a, b, and c", where a, b, and c may be singular or plural.

The foregoing descriptions about implementations allow a person skilled in the art to clearly understand that, for the purpose of convenient and brief description, division of the foregoing function modules is taken as an example for illustration. During actual application, the foregoing functions can be allocated to different modules and implemented according to requirements, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual coupling or direct coupling or communication connection may be implemented through some interfaces. Indirect coupling or communication connection between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on an actual requirement to achieve an objective of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the operations of the methods described in the embodiments of this application. The foregoing storage medium includes: any medium that can store program code, such as a USB flash drive, a removable hard disk, a ROM, a RAM, a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A relative positioning method, comprising:
    obtaining, by a first terminal, a plurality of first relative positions, wherein each of the plurality of first relative positions is determined based on a second relative position and a third relative position, wherein
    a first relative position is an initial relative position between the first terminal and a second terminal;
    the second relative position is a relative position between the first terminal and a reference point; and
    the third relative position is received from the reference point by the first terminal and is a relative position between the second terminal and the reference point; and
    processing, by the first terminal, the plurality of first relative positions to obtain a relative position between the first terminal and the second terminal, wherein
    the relative position comprises a length and an angle;
    the length is a length of a line segment between two terminals corresponding to the relative position;
    the angle is an included angle formed between a straight line on which the two terminals are located and a normal line along an angle direction;
    the normal line is a straight line in a preset direction;
    the angle direction is a clockwise direction or a counterclockwise direction; and
    the processing comprises adjusting a model based on the relative position to improve an accuracy of the relative position obtained by the first terminal.

2. The method according to claim 1, wherein obtaining the plurality of first relative positions comprises:
    sending a first message to the second terminal to request to obtain a plurality of third relative positions; receiving the plurality of third relative positions from the second terminal; and processing the plurality of third relative positions and a plurality of second relative positions to obtain the plurality of first relative positions; or
    sending a first message to a plurality of reference points to request to obtain the third relative position; receiving a plurality of third relative positions from the plurality of reference points; and processing the plurality of third relative positions and a plurality of second relative positions to obtain the plurality of first relative positions.

3. The method according to claim 2, further comprising:
    when the first terminal sends the first message to the second terminal, the first message comprises identity information of the plurality of reference points; or
    when the first terminal sends the first message to the plurality of reference points, the first message comprises identity information of the second terminal.

4. The method according to claim 2, further comprising:
    when the first terminal sends the first message to the second terminal, the first message further comprises a first trigger condition used to trigger the second terminal to send the plurality of third relative positions to the first terminal, wherein the first trigger condition comprises a preset periodicity and/or a preset relative position threshold, and the preset periodicity comprises a periodicity length and/or a preset quantity of sending times; or
    when the first terminal sends the first message to the plurality of reference points, the first message further comprises a first trigger condition used to trigger the plurality of reference points to send the plurality of third relative positions to the first terminal, wherein the first trigger condition comprises a preset periodicity and/or a preset relative position threshold, and the preset periodicity comprises a periodicity length and/or a preset quantity of sending times.

5. The method according to claim 1, wherein obtaining the plurality of first relative positions comprises:
    sending a second message to a plurality of reference points, wherein the second message is used to request to obtain the plurality of first relative positions; and receiving the plurality of first relative positions from the plurality of reference points; or
    sending a second message to a server used to request to obtain the plurality of first relative positions; and receiving the plurality of first relative positions from the server.

6. The method according to claim 5, wherein the second message comprises identity information of the second terminal.

7. The method according to claim 5, further comprising:
    when the first terminal sends the second message to the plurality of reference points, the second message further comprises a second trigger condition used to trigger the plurality of reference points to send the plurality of first relative positions to the first terminal, wherein the second trigger condition comprises a preset periodicity and/or a preset relative position threshold, and the preset periodicity comprises a periodicity length and/or a preset quantity of sending times; or
    when the first terminal sends the second message to the server, the second message further comprises a second trigger condition used to trigger the server to send the plurality of first relative positions to the first terminal, wherein the second trigger condition comprises a preset periodicity and/or a preset relative position threshold, and the preset periodicity comprises a periodicity length and/or a preset quantity of sending times.

8. The method according to claim 1, wherein the processing the plurality of first relative positions to obtain a relative position between the first terminal and the second terminal comprises:
performing weighting processing on the plurality of first relative positions to obtain the relative position between the first terminal and the second terminal; or
processing the plurality of first relative positions by using a preset probability distribution model, to obtain the relative position between the first terminal and the second terminal, wherein the model is the preset probability distribution model.

9. A relative positioning method, comprising:
receiving, by a second terminal, a first message from a first terminal, wherein the first message is used to request to obtain a plurality of third relative positions;
a third relative position is a relative position between the second terminal and a reference point; and
the first message comprises identity information of the plurality of reference points; and
sending, by the second terminal, the plurality of third relative positions to the first terminal, wherein
the first terminal uses the plurality of third relative positions to obtain a relative position between the first terminal and the second terminal;
the relative position comprises a length and an angle;
the length is a length of a line segment between two terminals corresponding to the relative position;
the angle is an included angle formed between a straight line on which the two terminals are located and a normal line along an angle direction;
the normal line is a straight line in a preset direction;
the angle direction is a clockwise direction or a counter-clockwise direction; and
the first terminal uses the relative position to adjust a model based on the relative position to improve an accuracy of the relative position.

10. The method according to claim 9, wherein the first message comprises a first trigger condition, wherein the first trigger condition is used to trigger the second terminal to send the plurality of third relative positions to the first terminal, the first trigger condition comprises a preset periodicity and/or a preset relative position threshold, and the preset periodicity comprises a periodicity length and/or a preset quantity of sending times.

11. A communication apparatus operating as a first terminal, comprising:
a processor; and
a memory coupled to the processor and storing instructions, which when executed by the processor, cause the apparatus to perform operations, the operations comprising:
obtaining a plurality of first relative positions, wherein each of the plurality of first relative positions is determined based on a second relative position and a third relative position, wherein
a first relative position is an initial relative position between the first terminal and a second terminal;
the second relative position is a relative position between the first terminal and a reference point; and
the third relative position is received from the reference point and is a relative position between the second terminal and the reference point; and
processing the plurality of first relative positions to obtain a relative position between the first terminal and the second terminal, wherein
the relative position comprises a length and an angle;
the length is a length of a line segment between two terminals corresponding to the relative position;
the angle is an included angle formed between a straight line on which the two terminals are located and a normal line along an angle direction;
the normal line is a straight line in a preset direction;
the angle direction is a clockwise direction or a counter-clockwise direction; and
the processing comprises adjusting a model based on the relative position to improve an accuracy of the relative position obtained by the first terminal.

12. The apparatus according to claim 11, wherein obtaining the plurality of first relative positions comprises:
sending a first message to the second terminal to request to obtain a plurality of third relative positions; receiving the plurality of third relative positions from the second terminal; and processing the plurality of third relative positions and a plurality of second relative positions to obtain the plurality of first relative positions; or
sending a first message to a plurality of reference points to request to obtain the third relative position; receiving a plurality of third relative positions from the plurality of reference points; and processing the plurality of third relative positions and a plurality of second relative positions to obtain the plurality of first relative positions.

13. The apparatus according to claim 12, further comprising:
when the first terminal sends the first message to the second terminal, the first message comprises identity information of the plurality of reference points; or
when the first terminal sends the first message to the plurality of reference points, the first message comprises identity information of the second terminal.

14. The apparatus according to claim 12, further comprising:
when the first terminal sends the first message to the second terminal, the first message further comprises a first trigger condition used to trigger the second terminal to send the plurality of third relative positions to the first terminal, wherein the first trigger condition comprises a preset periodicity and/or a preset relative position threshold, and the preset periodicity comprises a periodicity length and/or a preset quantity of sending times; or
when the first terminal sends the first message to the plurality of reference points, the first message further comprises a first trigger condition used to trigger the plurality of reference points to send the plurality of third relative positions to the first terminal, wherein the first trigger condition comprises a preset periodicity and/or a preset relative position threshold, and the preset periodicity comprises a periodicity length and/or a preset quantity of sending times.

15. The apparatus according to claim 11, wherein obtaining the plurality of first relative positions comprises:
sending a second message to a plurality of reference points, wherein the second message is used to request to obtain the plurality of first relative positions; and receiving the plurality of first relative positions from the plurality of reference points; or sending a second message to a server used to request to obtain the plurality of first relative positions; and receiving the plurality of first relative positions from the server.

16. The apparatus according to claim 15, wherein the second message comprises identity information of the second terminal.

17. The apparatus according to claim 15, further comprising: when the first terminal sends the second message to the plurality of reference points, the second message further comprises a second trigger condition used to trigger the plurality of reference points to send the plurality of first relative positions to the first terminal, wherein the second trigger condition comprises a preset periodicity and/or a preset relative position threshold, and the preset periodicity comprises a periodicity length and/or a preset quantity of sending times; or when the first terminal sends the second message to the server, the second message further comprises a second trigger condition used to trigger the server to send the plurality of first relative positions to the first terminal, wherein the second trigger condition comprises a preset periodicity and/or a preset relative position threshold, and the preset periodicity comprises a periodicity length and/or a preset quantity of sending times.

18. The apparatus according to claim 11, wherein the processing the plurality of first relative positions to obtain a relative position between the first terminal and the second terminal comprises:

performing weighting processing on the plurality of first relative positions to obtain the relative position between the first terminal and the second terminal; or processing the plurality of first relative positions by using a preset probability distribution model, to obtain the relative position between the first terminal and the second terminal, wherein the model is the preset probability distribution model.

* * * * *